(12) United States Patent
Hadley et al.

(10) Patent No.: US 11,738,598 B2
(45) Date of Patent: Aug. 29, 2023

(54) VEHICLE RECOVERY BOARD

(71) Applicant: Haigh Australia Pty Ltd, Brisbane (AU)

(72) Inventors: Christopher Edwin Hadley, Brisbane (AU); Ian Paul Smith, Brisbane (AU)

(73) Assignee: Haigh Australia Pty Ltd, Queensland (AU)

( * ) Notice: Subject to any disclaimer, the term of this patent is extended or adjusted under 35 U.S.C. 154(b) by 211 days.

(21) Appl. No.: 16/550,856

(22) Filed: Aug. 26, 2019

(65) Prior Publication Data

US 2020/0307313 A1 Oct. 1, 2020

(30) Foreign Application Priority Data

Mar. 25, 2019 (AU) ................................ 2019900994

(51) Int. Cl.
*B60B 39/12* (2006.01)
(52) U.S. Cl.
CPC .................................... *B60B 39/12* (2013.01)
(58) Field of Classification Search
CPC ......... B60B 39/12; B60B 39/00; B60B 15/00; B60C 27/00; E01C 9/08; E01C 9/086; E01C 9/083; B66F 7/00; B66F 7/243
USPC .......................................................... 238/14
See application file for complete search history.

(56) References Cited

U.S. PATENT DOCUMENTS

| 450,645 | A | | 4/1891 | Love |
| 1,961,873 | A | * | 6/1934 | Sterling ............... B66F 7/243 |
| | | | | 254/88 |
| D255,560 | S | | 6/1980 | LaPointe |
| D255,791 | S | | 7/1980 | LaPointe |
| 4,223,835 | A | * | 9/1980 | Witt ..................... B60B 39/12 |
| | | | | 238/14 |
| 4,300,722 | A | | 11/1981 | Simmons |
| D301,222 | S | | 5/1989 | Smith |
| D308,035 | S | | 5/1990 | Goto |

(Continued)

FOREIGN PATENT DOCUMENTS

| AU | 2006301867 B2 | 11/2012 |
| AU | 2011202303 A1 | 12/2012 |

(Continued)

OTHER PUBLICATIONS

IP Australia Examination Report No. 1 for AU2019219722, pp. 1-6, dated Dec. 14, 2021, Australia.

(Continued)

*Primary Examiner* — Zachary L Kuhfuss
*Assistant Examiner* — Cheng Lin
(74) *Attorney, Agent, or Firm* — Wegman Hessler Valore

(57) ABSTRACT

The present invention is directed to a vehicle recovery board having a rectangular body with a flat topside surface and an inclined front portion of the underside surface. The flat topside surface does not have a ramp front section. The flat topside surface provides a surface at a constant angle to allow a tire to move on and along without providing an initial steep slope to gain traction. The vehicle recovery board also includes features that improve tire traction and dislodge water, sand and other material from the tread of tires. The vehicle recovery board of the present invention also has ground engagement teeth on the underside of the board to reduce slippage of the board during use.

26 Claims, 18 Drawing Sheets

(56) References Cited

U.S. PATENT DOCUMENTS

| | | | |
|---|---|---|---|
| 4,993,768 A * | 2/1991 | Ewen | A01B 1/20 |
| | | | 238/14 |
| D315,326 S | 3/1991 | Pinto | |
| D355,807 S | 2/1995 | O'Rourke | |
| D364,837 S | 12/1995 | Hargrove | |
| 5,486,027 A * | 1/1996 | Dionne | A01B 1/022 |
| | | | 238/14 |
| 5,538,183 A | 7/1996 | Mcgee | |
| 6,394,362 B1 | 5/2002 | Kramr | |
| 6,520,420 B1 | 2/2003 | Singh | |
| 7,104,524 B1 * | 9/2006 | Hidding | B66F 7/243 |
| | | | 14/69.5 |
| 7,350,719 B1 | 4/2008 | Brenner | |
| D615,032 S | 5/2010 | Pinto | |
| D643,806 S | 8/2011 | Yeh | |
| D649,928 S | 12/2011 | Cui | |
| D654,428 S * | 2/2012 | Chiang | B29C 45/14426 |
| | | | D12/608 |
| 8,231,066 B2 * | 7/2012 | McCarthy | B60B 39/12 |
| | | | 238/14 |
| D669,025 S | 10/2012 | Spektor | |
| 8,448,877 B1 | 5/2013 | Aubin | |
| D700,887 S * | 3/2014 | Minnis | D12/608 |
| D702,057 S | 4/2014 | Nutzati | |
| 8,782,839 B1 * | 7/2014 | Forbis | B66F 7/243 |
| | | | 14/69.5 |
| D710,790 S | 8/2014 | O'Dell | |
| D775,068 S * | 12/2016 | Wippler | D12/608 |
| D829,148 S | 9/2018 | Joyce | |
| 10,661,606 B2 * | 5/2020 | McCarthy | B60B 39/12 |
| 2008/0217077 A1 | 9/2008 | McCarthy | |
| 2017/0232939 A1 | 8/2017 | Klier | |
| 2018/0339552 A1 * | 11/2018 | Hermans | B29C 45/14426 |
| 2020/0047553 A1 * | 2/2020 | Harrington | B60B 39/12 |

FOREIGN PATENT DOCUMENTS

| | | |
|---|---|---|
| AU | 2012205168 B2 | 1/2013 |
| AU | 2016349949 A1 | 10/2017 |
| JP | H02128902 A | 5/1990 |
| WO | 2017070740 A1 | 5/2017 |
| WO | 2017075665 A1 | 5/2017 |

OTHER PUBLICATIONS

Arbusa, Tred Recovery Boards, pp. 1-5, date: Feb. 2019-May 2022, www.arbusa.com/recovery/tred.

IP Australia; Design 201210851 Registration 341424, pp. 1-2, date: Feb. 22, 2022.

European Patent Office, European Search Report for Appl. No. 20777484.5, pp. 1-7, dated Aug. 29, 2022.

Miaxtrax, Maxtrax MKII Black, pp. 1-3, Date: Jan. 2016-Oct. 2022, www.maxtrax.com.au/product/maxtrax-mkii-black.

* cited by examiner

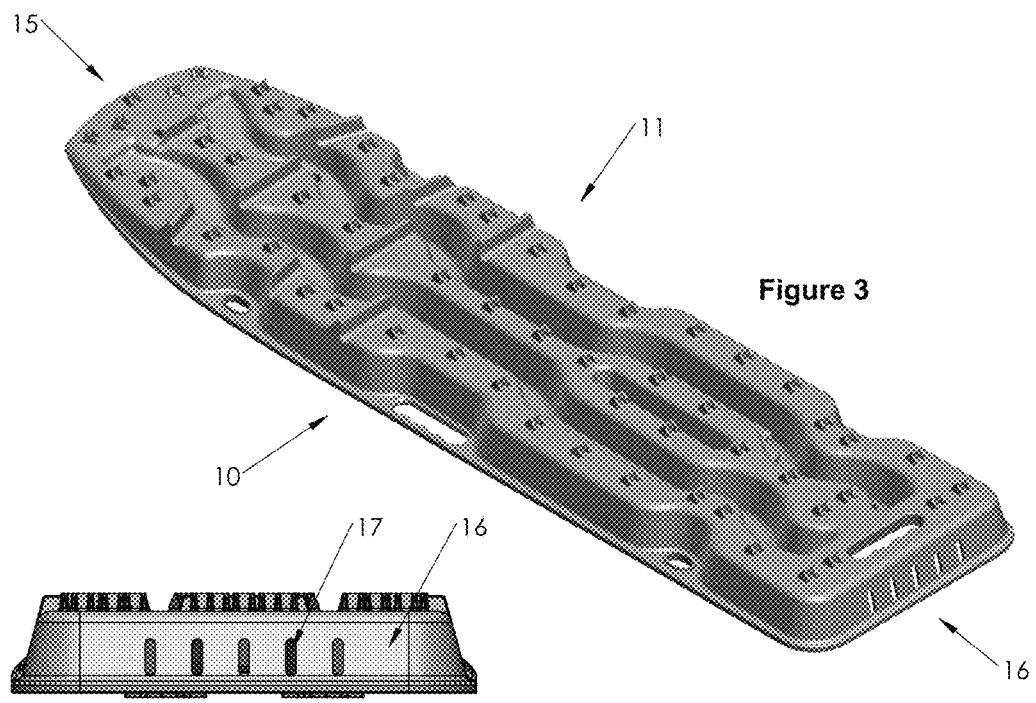
Figure 3
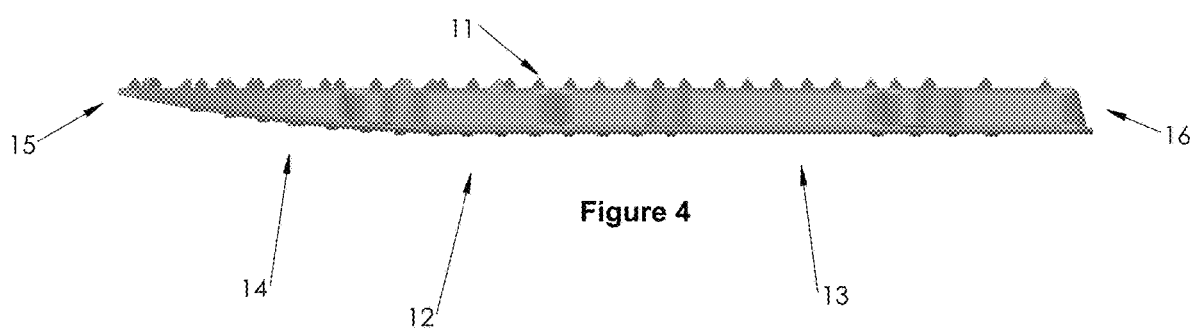
Figure 6
Figure 4
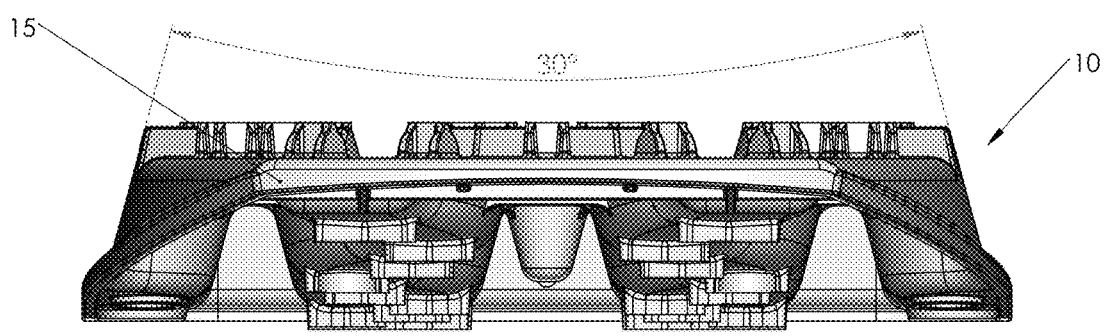
Figure 5

Figure 15
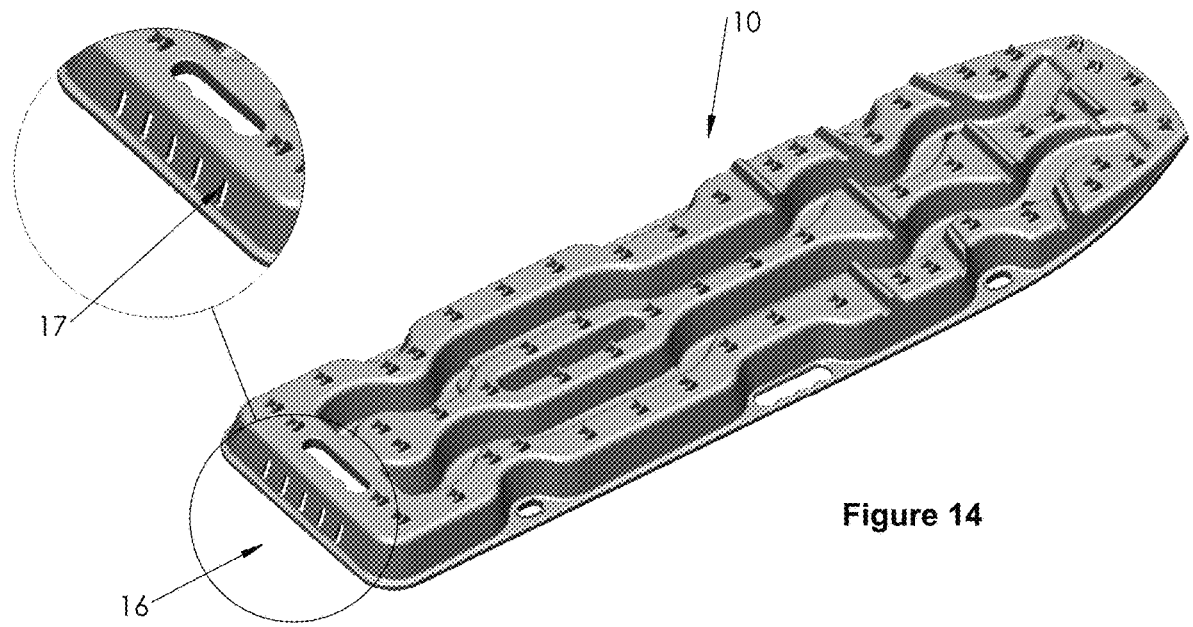
Figure 14
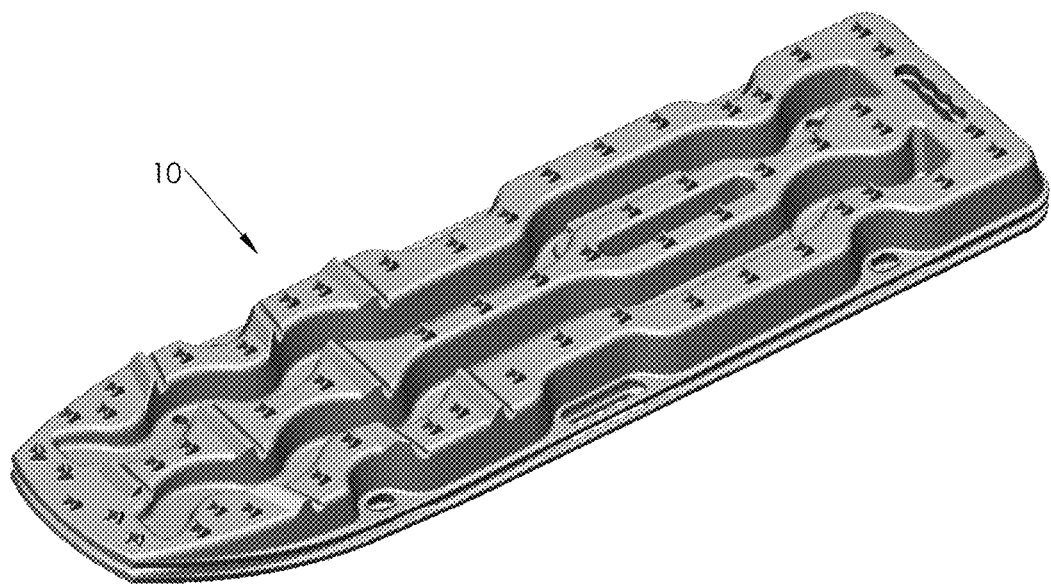
Figure 16

VEHICLE RECOVERY BOARD

CROSS REFERENCE TO RELATED APPLICATION

This application claims the priority filing benefit of Australian Patent Application No. 2019900994 filed Mar. 25, 2019, which is incorporated herein by reference in its entirety.

FIELD OF INVENTION

The present invention relates to vehicle recovery equipment. The present invention has particular but not exclusive application for use in moving vehicles stuck in sand, mud, snow or other soft surface. Reference in the description to the use of the invention in sand environments is by way of example only and the invention is not limited to this particular use.

BACKGROUND OF THE INVENTION

Vehicle recovery boards have been used to assist vehicles from a situation where their wheels spin and are stuck in a sand trap. The wheels are unable to gain sufficient traction to drive the vehicle forward (or backward). As the wheel spins, it digs a hole and the wheel becomes partially buried within the hole. It is then necessary for the sand to be dug away from the wheel and then position the vehicle recovery board adjacent the wheel so it can roll onto the recovery board. The recovery board provides a solid platform for the wheel to grip and gain traction to move the vehicle out of the sand trap.

Different types of recovery boards have been developed. Many recovery boards have a ramp front section to allow the tire to ease onto the board. Australian patents AU2006301867 and AU2012205168 describe recovery boards with a front ramp that is provided for a vehicle wheel to roll onto or off. The ramp also has a series of studs projecting outwardly. The studs provide additional grip for the tire on the board.

AU2016345065 discloses a recovery board with a front ramp and outwardly extending studs on the front ramp and across the top surface of the recovery board. The recovery board also has several longitudinal recesses to provide a varying topside surface to assist with traction.

AU2016349949 describes an alternate recovery board that uses removeable studs that can be replaced if the located studs are damaged during use. The replacement studs have a screw thread to engage in a socket that has a complementary thread.

The studs on the front section (including the ramp) of the recovery board are often damaged as a result of the tire spinning rapidly in the attempt to gain traction. The spinning vehicle wheel creates friction and generates heat. The combination of heat and the abrasiveness of the spinning wheel wears down the ramp studs. This appears to be a common problem suffered by all makes of the recovery board.

OBJECT OF THE INVENTION

It is an object of the present invention to provide an alternate vehicle recovery board that addresses one or more of the above mentioned problems or provides a useful alternative to the prior art recovery boards.

SUMMARY OF THE INVENTION

The inventors of the current invention identified the problem of the wearing of the studs and redesigned the recovery board to address the problem. They recognized that in use the ramp portion provided an additional barrier to the wheel mounting the recovery board. They concluded that when prior art recovery boards were used, the ramp portion formed a steep angle for the vehicle wheel to climb. The steepness of the angle contributed to the wheel spinning and damaging the studs. The inventors then developed a recovery board that did not have a ramp. This step of developing a rampless recovery board is a step in a direction that is opposite to the current conventional thinking. They discovered that the rampless recovery board when positioned adjacent the tire formed a comparatively reduced angle for the wheel to move on and along the recovery board.

In one aspect the present invention broadly resides in a vehicle recovery board having a substantially rectangular body with a substantially flat topside surface and an inclined front portion of the underside surface; wherein the inclined front portion directs the underside surface upwards towards the topside surface near the front end.

The inclined front portion of the underside surface can include any surface shape that is overall inclined upwards. The inclined front portion of the underside surface includes (but not limited to) a straight flat surface, a stepped surface and a curved (including convex and concave) surface.

The inclination of the front portion of the underside surface can extend partway along the length of the board or the full length of the board so that the board has an appearance of an inverted wedge.

In another aspect the present invention broadly resides in a vehicle recovery board having a substantially rectangular body with a substantially flat topside surface and an inclined front portion of the underside surface; wherein the inclined front portion directs the underside surface upwards towards the topside surface near the front end and there is no change in the inclination of the substantially flat topside surface when a tire of a vehicle rolls along it.

In the embodiment where the front underside portion is curved, it is preferably convex relative to the flat topside surface. In one embodiment the front underside surface portion has a shallow (or near flat) curve.

Preferably the front underside portion has one or more downwardly extending projections that engage the soft ground surface and assist in maintaining the position of the board as the vehicle rolls along it.

The degree of inclination or the shape of the curve of the front underside portion allows the board to be positioned next to or partially beneath the tire, so that it can move on the board without encountering any change in the angle of the positioned board. Preferably the positioning of the recovery board turns the entire recovery board into a flat ramp from which the tire and hence vehicle can escape the trapped position.

The topside surface preferably has one or more longitudinal grooves spaced apart by ridge(s), each of which have a plurality of studs positioned along the length of the board. Reference to studs with respect to the present invention also includes nodules and other small upwardly-extending projections. More preferably, the grooves have a wave-like shape. Preferably there are a plurality of studs along the outer ridges to provide grip to tires over the entire topside surface. The studs are preferably shaped projections and are preferably located in different orientations on the board.

In an alternate embodiment the topside surface does not have a longitudinal groove but has a plurality of studs.

The topside surface preferably has one or more cleats extending across a ridge. Preferably there are one or more cleats on each of the ridges. The cleats are preferably raised lugs that provide additional grip for the tires. Because the grooves and consequently the ridges have a wave-like shape, the angle (with respect to the longitudinal axis of the recovery board) of each of the cleats, can be different. In a preferred embodiment there are multiple cleats along a front section of the recovery board. Preferably, the number of cleats can vary between 2 and 10. Preferably the shape, placement position, orientation and number of the cleats provides an uneven surface for a tire to gain traction.

The cleats are preferably spaced from each other to allow different parts of the tire to gain traction and cater for different tire sizes and tread patterns. The cleats are angled differently from each other for similar reasons. Preferably the cleats in adjacent ridges are not aligned with each other so as not to weaken the board in any particular area and maximise the opportunity to provide traction for the tires.

In an alternate embodiment the topside surface does not have any cleats.

The arrangement of wave-like grooves, studs and cleats preferably provides a topside surface that enables vehicle tires to gain traction. Preferably the arrangement enables tires to readily grip the topside surface comparatively easier or quicker than on prior art recovery boards.

Preferably adjacent each of the cleats, there is a transverse channel across the respective ridge. The transverse channel is preferably positioned after the respective cleat with reference to the front end of the recovery board. More preferably each of the one or more transverse channels is deeper nearer the grooves so water, sand, mud or other particulates can flow into the grooves.

In an alternate embodiment there is no transverse channel extending across a ridge.

The underside of the recovery board preferably has a plurality of ground engagement teeth to reduce slippage of the board when the tire attempts to gain traction on the topside surface of the board. The ground engagement teeth can be of any suitable shape. In a preferred embodiment the ground engagement teeth have a chevron shape or a Y-like shape. In another embodiment, a front section of the underside of the board has a plurality of spikes or teeth to assist in holding the board in place during use.

The recovery board can preferably be used as a shovel to remove sand and the like from around a tire. In one or more preferred embodiments, there are hand grips at a rear end and or along one or both longitudinal sides of the board. The hand grips are preferably shaped to facilitate the shoveling action.

In a preferred embodiment, the recovery board has a removeable base attachable to the underside of the board. The removable base preferably has a square or cross shape so that it can fit within the underside of the board. One side of the removeable base has a solid surface for supporting a jack and the other side has a lattice structure to provide a grip pattern when the two boards are joined together.

In an alternate embodiment the removeable base has a solid complete (non-lattice) structure on both sides.

The removeable base when it is positioned within the board can preferably be used to support a jack or other similar lifting device. When the removeable base is positioned within the board, there is additional surface area over which to spread the load. The position of the board is not critical as the removable base has a substantially square shape. The removeable base can preferably be used to connect two recovery boards to form an extended platform for the recovery of a vehicle. Preferably the recovery boards are connectable at their rear ends and the removable base can preferably attach to both boards via a pin and slot arrangement.

The recovery boards are preferably shaped so that they can be stacked during storage or transport. Two recovery boards a preferably stackable with only one of the boards having a removeable base.

The recovery boards can be made of any suitable material including plastics and metal. The thickness of the board can change with the material used to obtain the preferred strength. In one embodiment the recovery board is made of glass reinforced nylon. In another preferred embodiment the recovery board is made of polypropylene.

Different recovery boards can have different combinations of features depending on their proposed usage and market. In one embodiment a recovery board made of glass reinforced nylon has the features of a flat topside surface, an inclined or curved front portion of the underside surface; a plurality of longitudinal grooves spaced apart by ridges each of which have a plurality of studs positioned along the length of the board; a plurality of cleats and adjacent transverse channels; a plurality of ground engagement teeth on the underside of the board; one or more hand grips at a rear end and along one or both longitudinal sides of the board and a removeable base. In another embodiment made of polypropylene, the recovery board has the features of a flat topside surface, an inclined or curved front portion of the underside surface; a plurality of longitudinal grooves spaced apart by ridges each of which have a plurality of studs positioned along the length of the board; a plurality of ground engagement teeth on the underside of the board; one or more hand grips at a rear end and along one or both longitudinal sides of the board.

The features described with respect to one aspect also apply where applicable to all other aspects of the invention. Furthermore, different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein:

FIG. 3 is a top rear side diagrammatic view of the recovery board shown in FIG. 1;

FIG. 4 is a side view of the recovery board shown in FIG. 1;

FIG. 5 is a front view of the recovery board shown in FIG. 1;

FIG. 6 is a rear view of the recovery board shown in FIG. 1;

FIG. 14 is a diagrammatic view of the recovery board of the first preferred embodiment showing a plurality of slots at the rear end and FIG. 15 is a partial view of the slots for the attachment of the removable base;

FIG. 16 is a diagrammatic perspective view of two recovery boards of the first preferred embodiment nesting or stacked together;

FIG. 28 is a diagrammatic view of the second preferred embodiment of the recovery board wherein

FIG. 33 is a diagrammatic view of the underside of the second preferred embodiment of the recovery board in a nesting or stacked arrangement whereas

FIG. 43 is a diagrammatic view of the third preferred embodiment of the recovery board wherein

DETAILED DESCRIPTION OF THE PREFERRED EMBODIMENT

The recovery board of the present invention was developed from considering the problem of damaged studs caused by spinning wheels attempting to gain traction on the prior art recovery boards. An illustrative comparison of a prior art recovery board and the recovery board of the present invention is made in the FIGS. 18 to 21 where they are inserted at the same angle with the same amount of material removed from in front of the tire prior to positioning.

Figure 18:
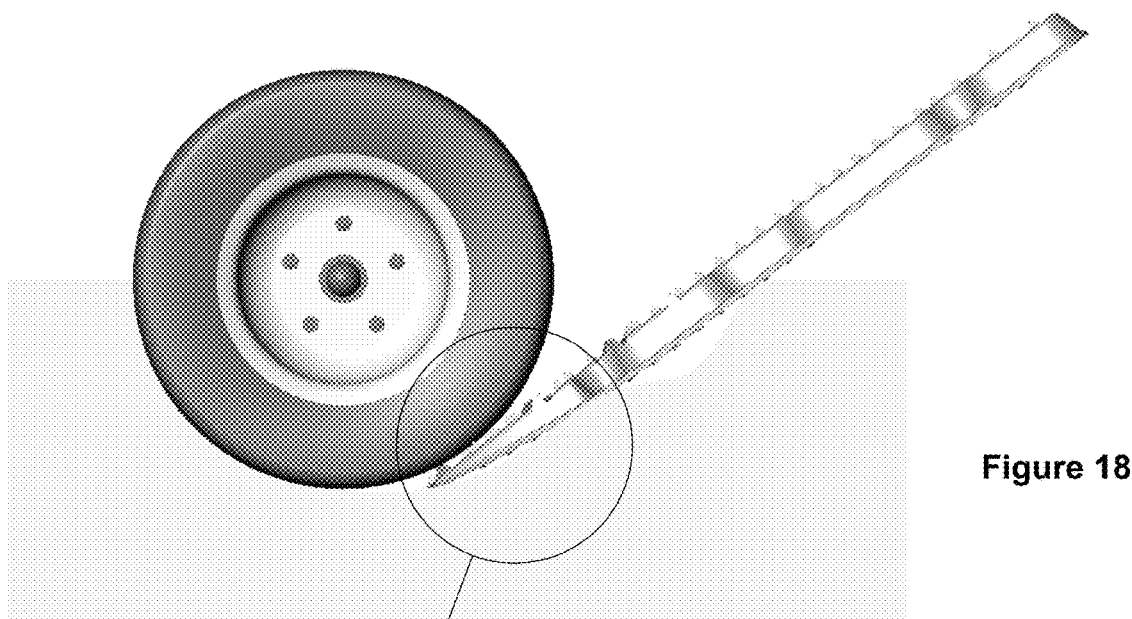
FIG. 18 is a diagrammatic view of the recovery board of the first preferred embodiment positioned adjacent a vehicle wheel and FIG. 19 is an expanded view of the positioning of the recovery board adjacent the vehicle wheel.
Figure 19:
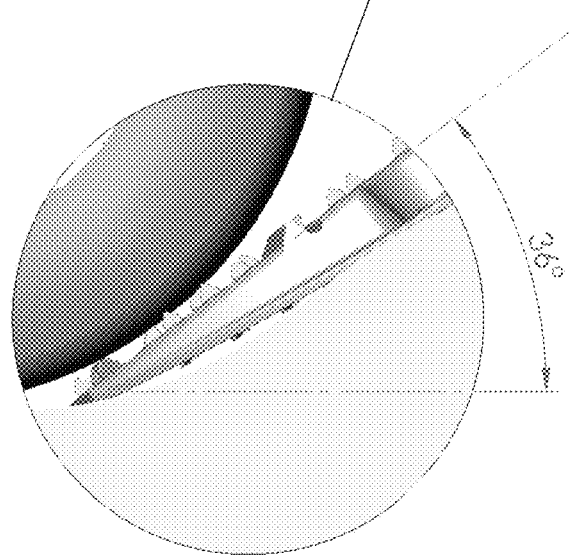
Figure 21:
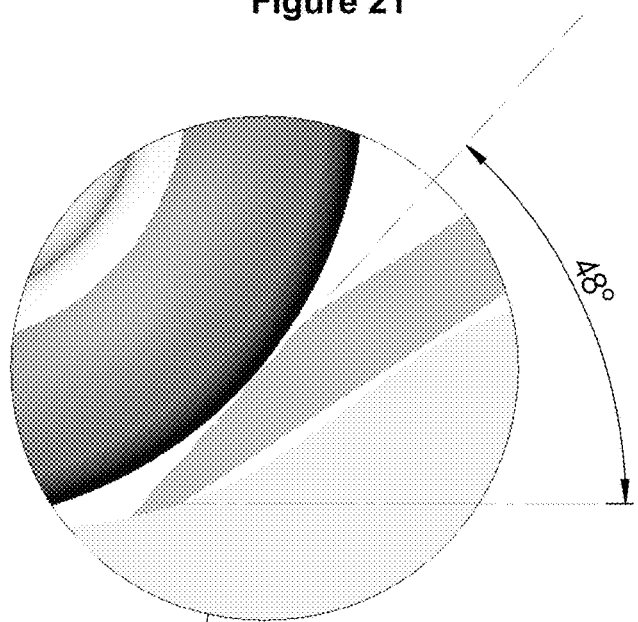
FIG. 20 is a diagrammatic view of a prior art recovery board positioned adjacent a vehicle wheel and FIG. 21 is an expanded view of the prior art recovery board positioned proximal to the vehicle wheel.
Figure 20:
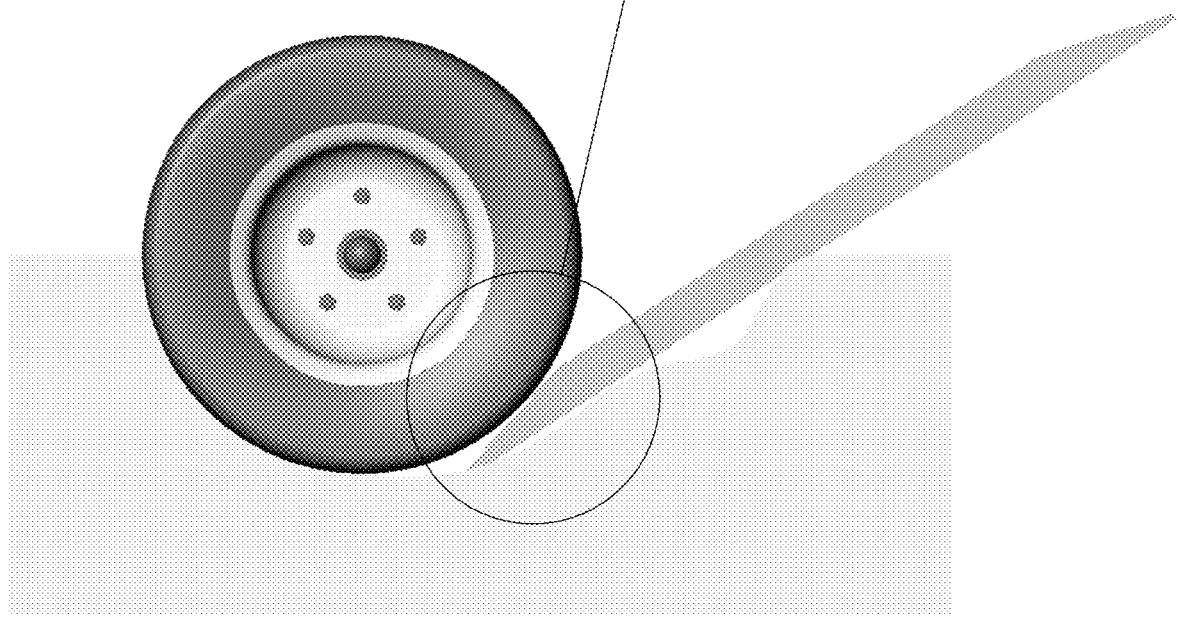
Figure 22:
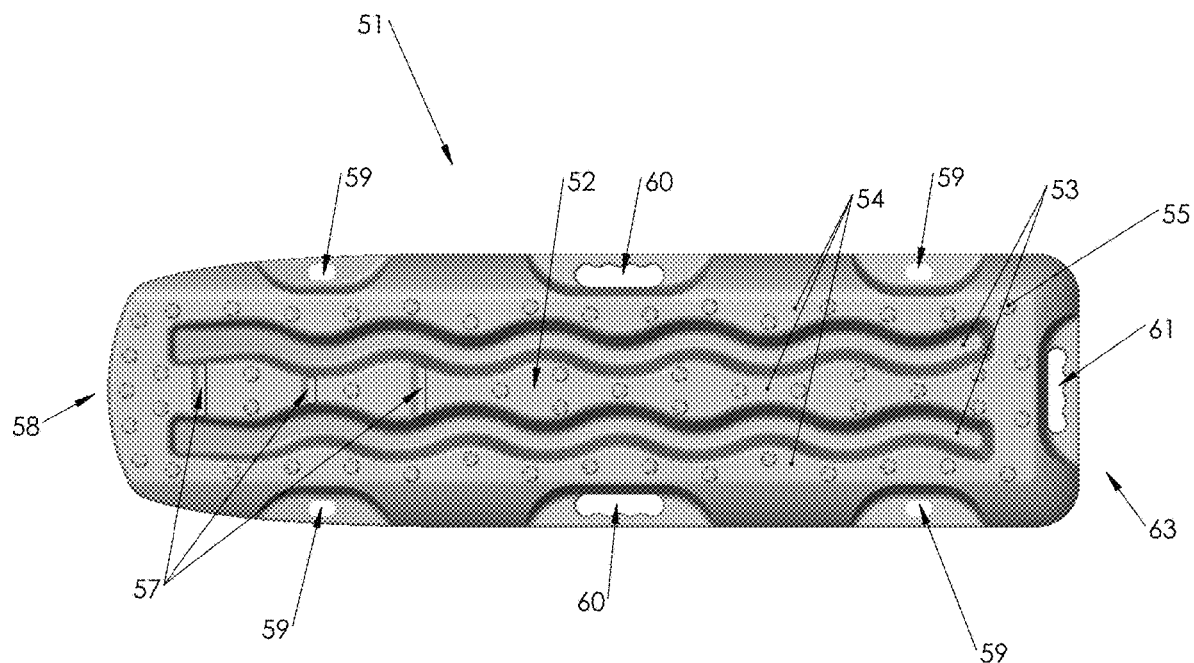
FIG. 22 is a diagrammatic plan view of a second preferred embodiment of the recovery board.
Figure 23:
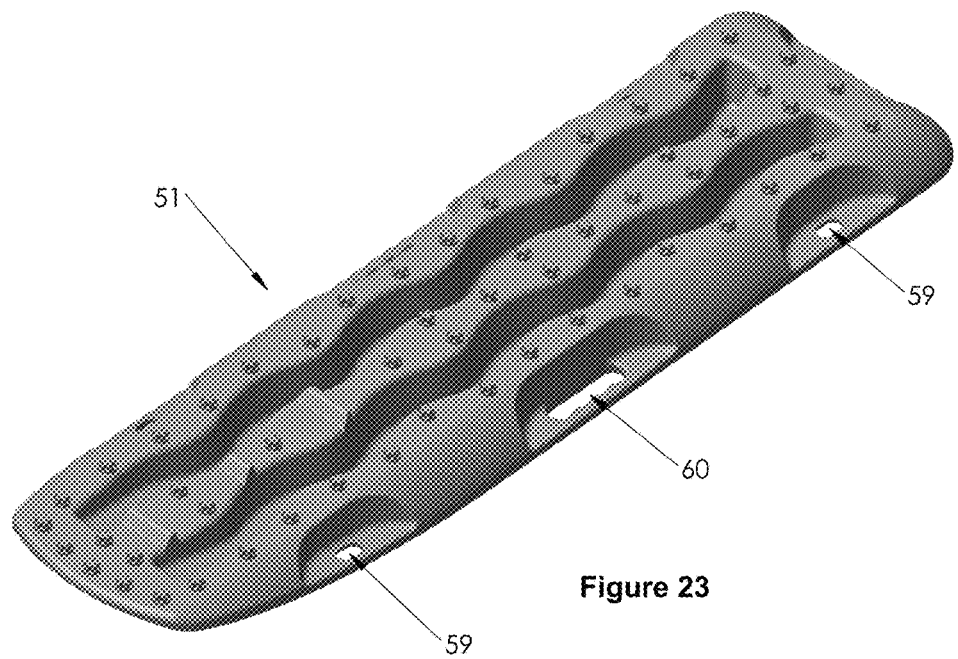
FIG. 23 is a top front view of the recovery board shown in FIG. 22.
Figure 24:
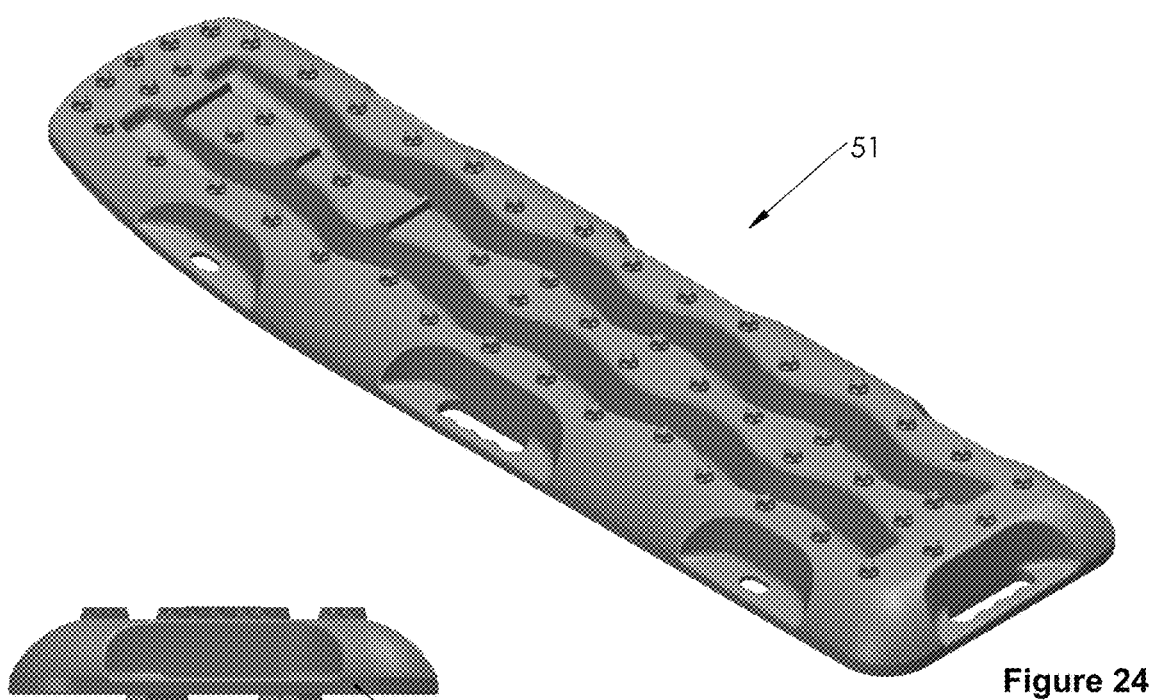
FIG. 24 is a top rear view of the second preferred embodiment of the recovery board as shown in FIG. 22.
Figure 26:
FIG. 26 is a rear view of the second preferred embodiment of the recovery board.
Figure 25:
FIG. 25 is a side view of the second preferred embodiment of the recovery board.
Figure 25:
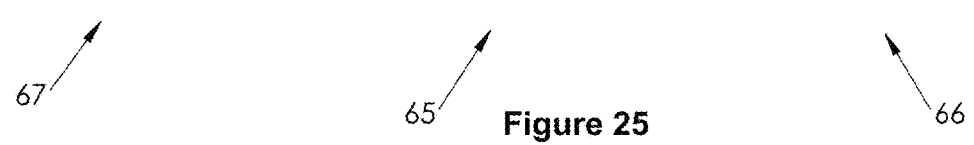
Figure 27:
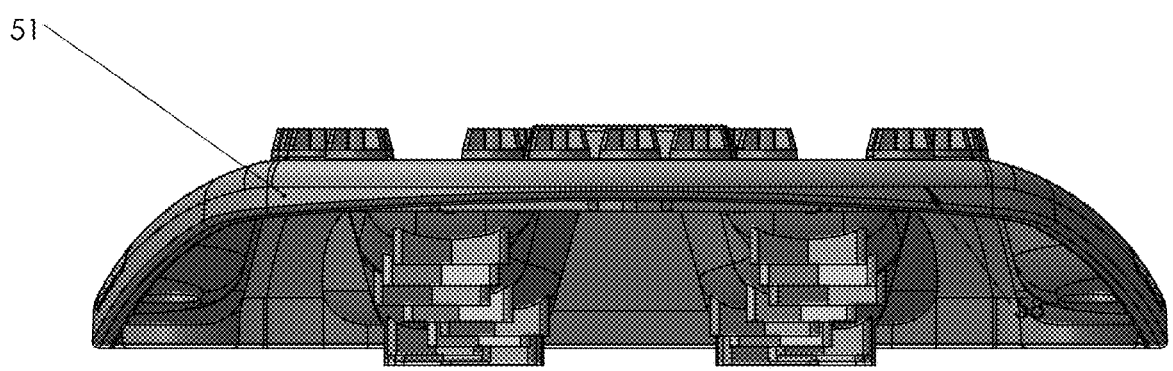
FIG. 27 is a front view of the second preferred embodiment of the recovery board.
Figure 29:
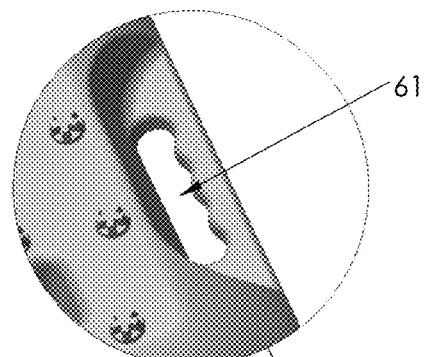
FIG. 29 is an expanded view of a rear handle.
Figure 31:
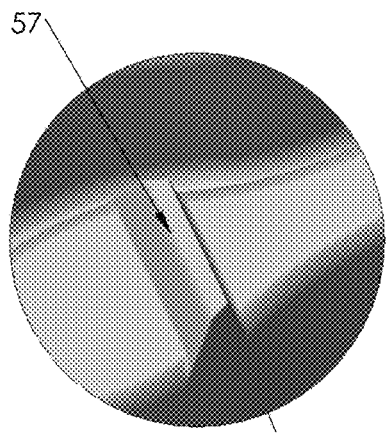
FIG. 31 is an expanded view of a cleat.
Figure 28:
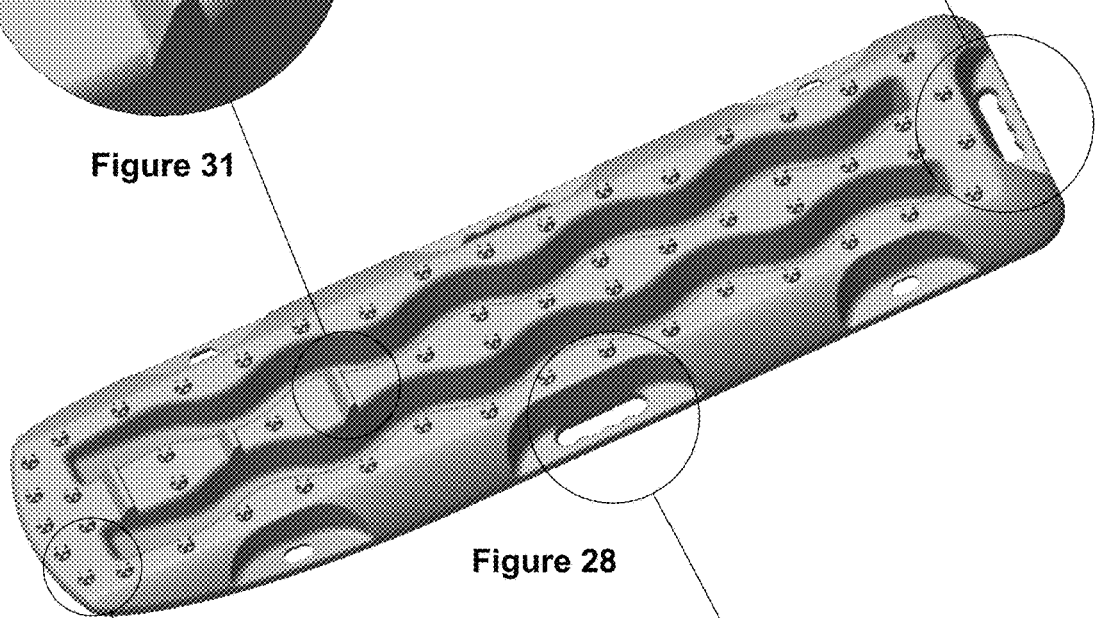
Figure 30:
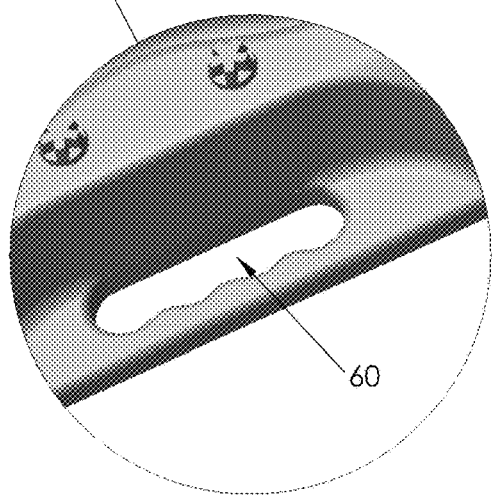
FIG. 30 is an expanded view of a side handle.
Figure 32:
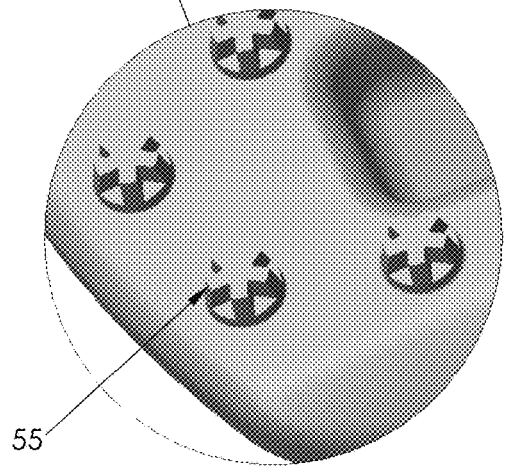
FIG. 32 is an expanded view of star shaped studs on the topside surface.

FIGS. 20 and 21 diagrammatically show that there is a steep angle formed by a front ramp when a wheel is to climb onto the recovery board. In the illustrative example shown in FIG. 21, there is shown a gradient of 48° which the wheel must climb before the gradient eases off after it passes the ramp portion. In contrast, the recovery board of the present invention has no front ramp and as shown in FIGS. 18 and 19, the wheel must climb a constant gradient of 36° to gain traction. With the recovery board of the present invention, the vehicle recovery board can be positioned so that a tire can gain traction on the front of the board as soon as the wheel turns.

Figure 1:
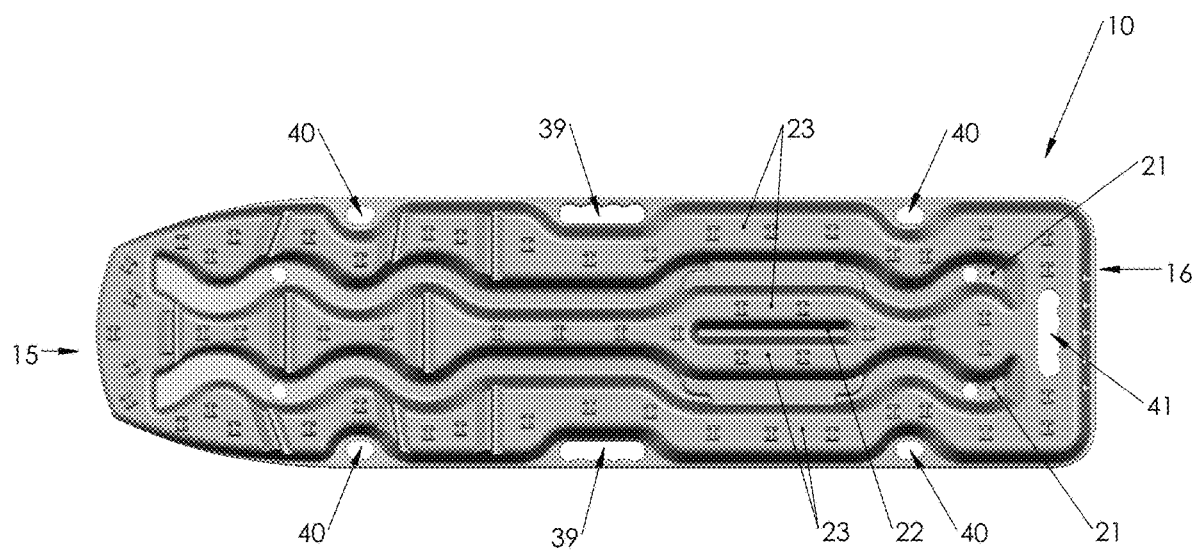
FIG. 1 is a diagrammatic plan view of the first preferred embodiment of the recovery board.
Figure 2:
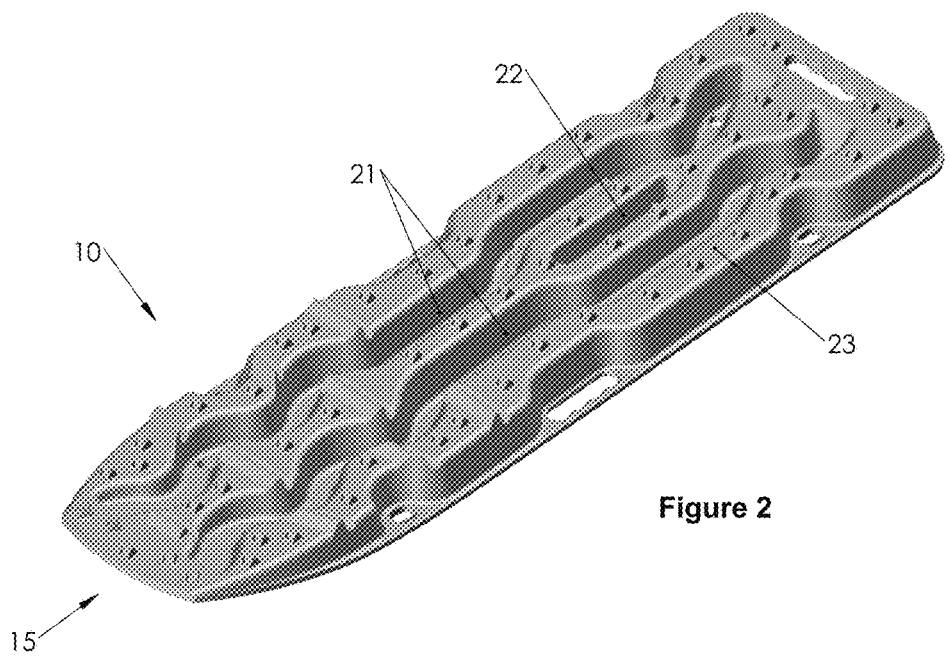
FIG. 2 is a front side diagrammatic view of the recovery board shown in FIG. 1.
Figure 7:
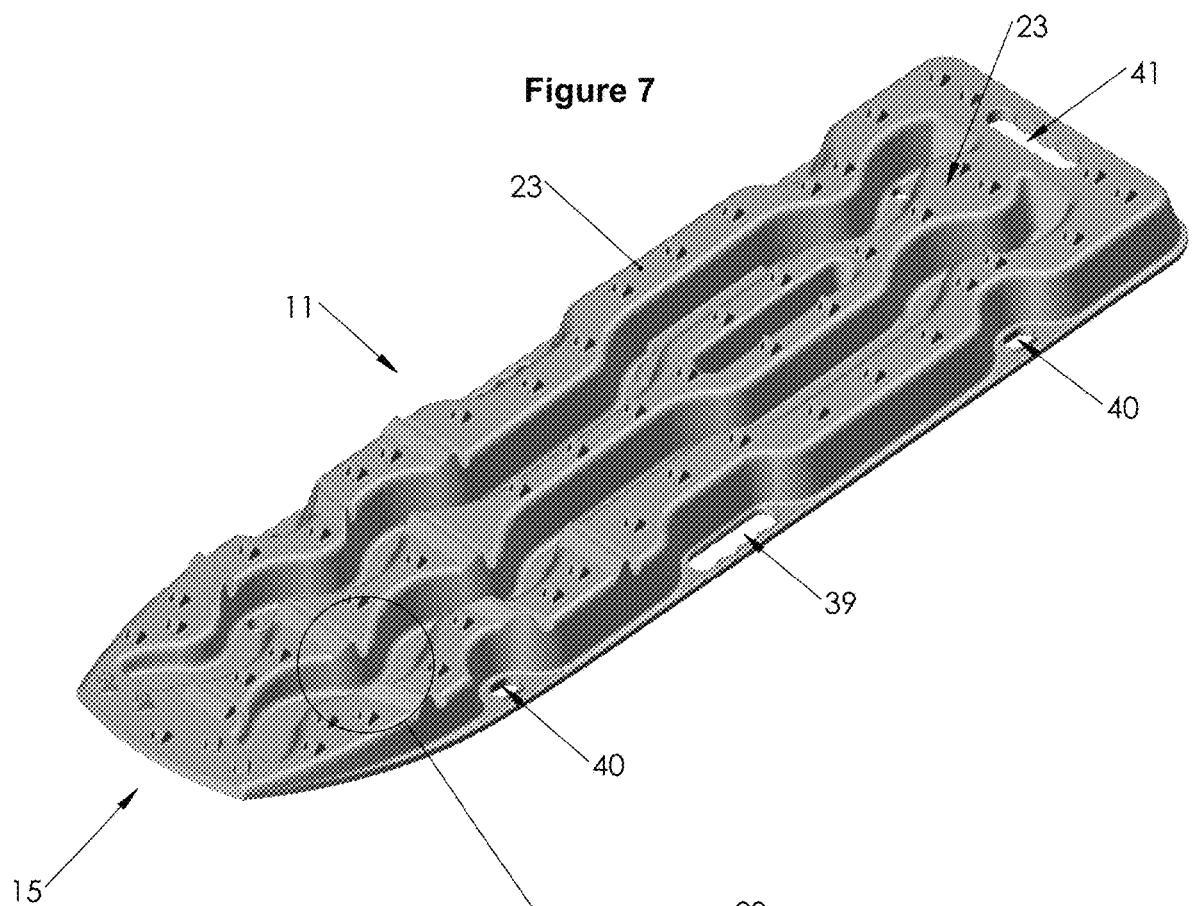
FIG. 7 is a top diagrammatic view of the first preferred embodiment of the recovery board and FIG. 8 is a partial view of the cleats and transverse channel of the recovery board shown in FIG. 7.
Figure 8:
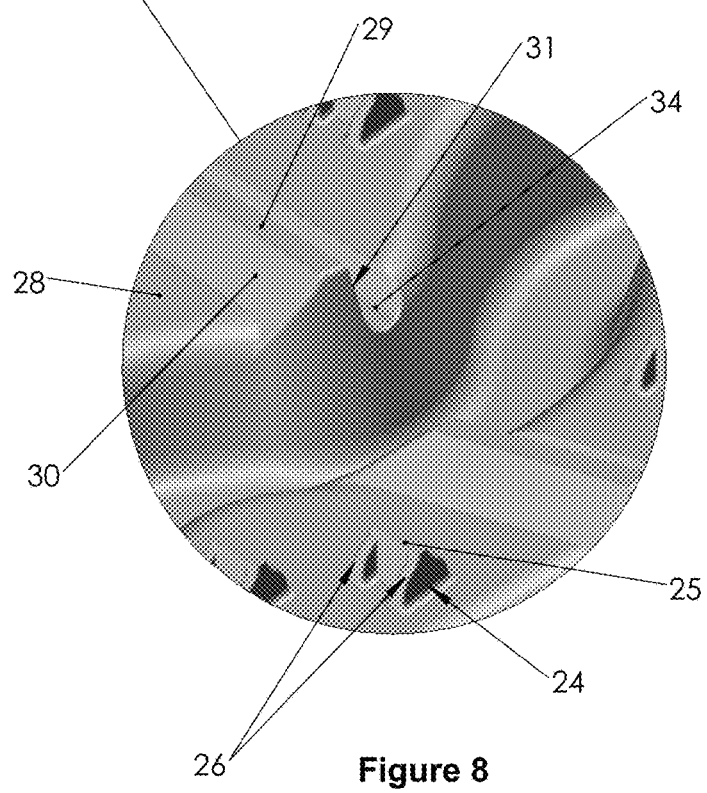

In FIG. 1, there is shown a first preferred embodiment of the vehicle recovery board 10. The vehicle recovery board 10 is substantially rectangular in shape and is made as a one-piece article. The vehicle recovery board 10 is made of glass reinforced nylon and formed to provide maximum strength per weight of material.

The vehicle recovery board 10 is also shown in FIGS. 2 to 6 where different views are presented. The vehicle recovery board 10 has a topside surface 11 and an underside surface 12. With particular reference to FIG. 4, the vehicle recovery board 10 shows a relatively flat topside surface 11 and an underside surface 12 that has a rear flat underside section 13 and an inclined front underside section 14. The inclined front underside section 14 rises to meet the topside surface 11 at the front end 15. Different embodiments can include one or a series of curves, steps or straight section(s). The rear end 16 of the vehicle recovery board 10 has a series of five slots 17 which are used for the attachment of the removable base 45.

The topside surface 11 has two longitudinal wave shaped grooves 21 and a short straight longitudinally-disposed groove 22. The grooves 21, 22 are spaced apart by ridges 23. The ridges 23 have a plurality of upwardly projecting studs 24 spaced apart thereon. There is also a series of studs 24 adjacent the front end 15. The series of studs 24 adjacent the front end 15 are orientated differently to maximise traction of tires with different tread and tires of different size. The studs 24 include an upright wall 25 with two supports 26.

The topside surface 11 also includes a series of cleats 28 near the front end 15. In total there are 9 cleats on the topside surface 11. More particularly there are a series of three cleats 28 spaced apart along each of the ridges 23. Each of the three cleats 28 spaced along a ridge 23 is orientated differently to facilitate the grip of tires with different tread patterns and wheels of different size. Each of the cleats 28 comprise a reinforced wall 29 extending across the respective ridge 23. The cleats 28 are aligned so that a sloped face 30 of the wall 29 is proximal to the front end 15 and an upright face 31 faces away from the front end 15. Each of the cleats has a transverse channel 34 adjacent the upright face 31 and extending between the grooves 21 or between the grooves 21 and the side of the vehicle recovery board 10. Each of the transverse channels 34 are deeper towards their ends. The arrangement of the cleat 28 adjacent the transverse channel 34 provides additional traction to tires and dislodge sand, water and other material from the tread of tires to improve tire traction. Sand, water and other materials can be dislodged from the tread of tires by their interaction with the cleat wall 29 and pass into the transverse channel 34 and grooves 21, 22.

Along each side of the vehicle recovery board there is a hand grip 39 and two apertures 40. There is also a hand grip 41 adjacent the rear end 16. The hand grips 39, 41 are used when the vehicle recovery board 10 is turned upside down and used as a shovel to remove sand and other material from around a tire. The apertures 40 are used to tie down a single or nested vehicle recovery boards 10 during transport or storage. The apertures 40 can also be used to anchor the vehicle recovery board 10 in position during use.

Figure 9:
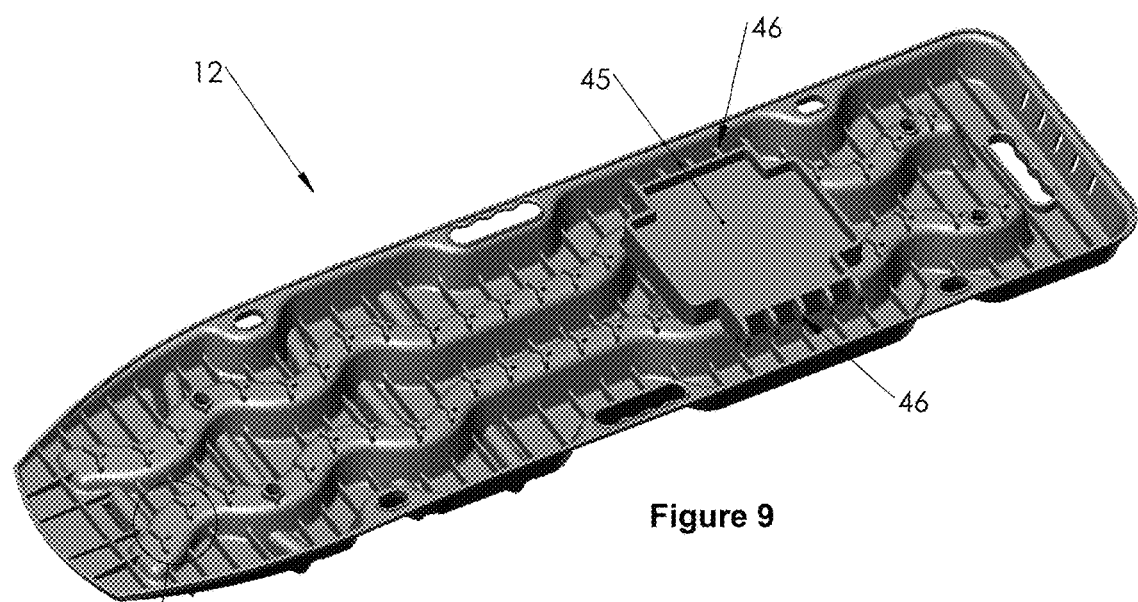
FIG. 9 and FIG. 10 are a diagrammatic views of the underside of the recovery board of the first preferred embodiment with and without a removable base respectively.
Figure 10:
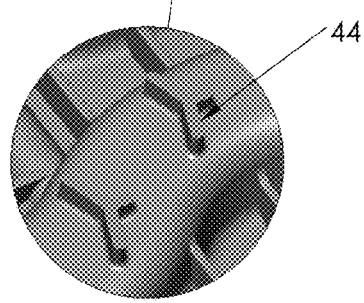
Figure 10:
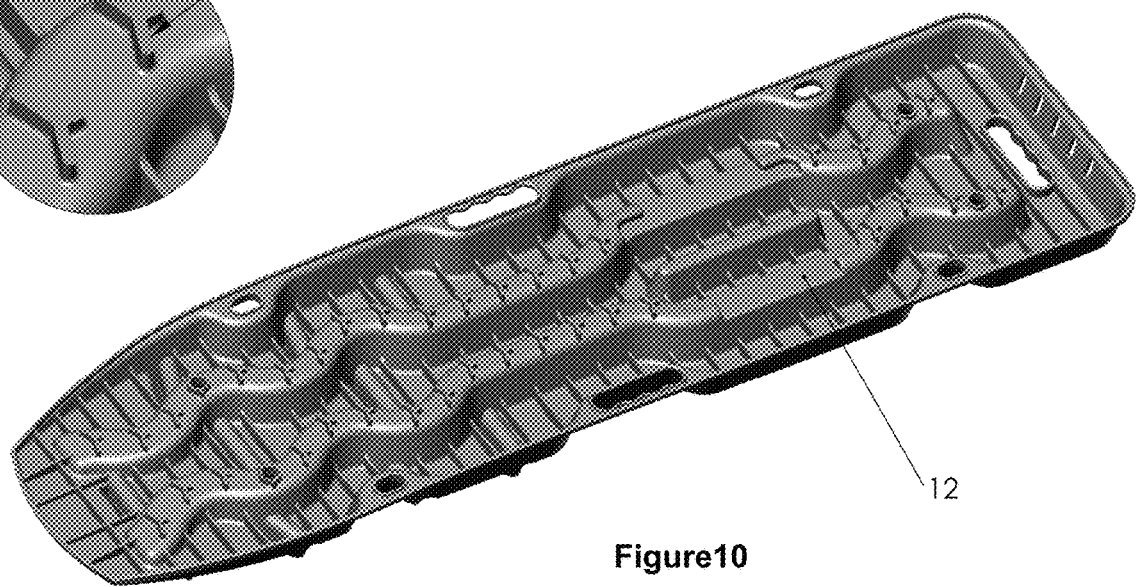
Figure 11:
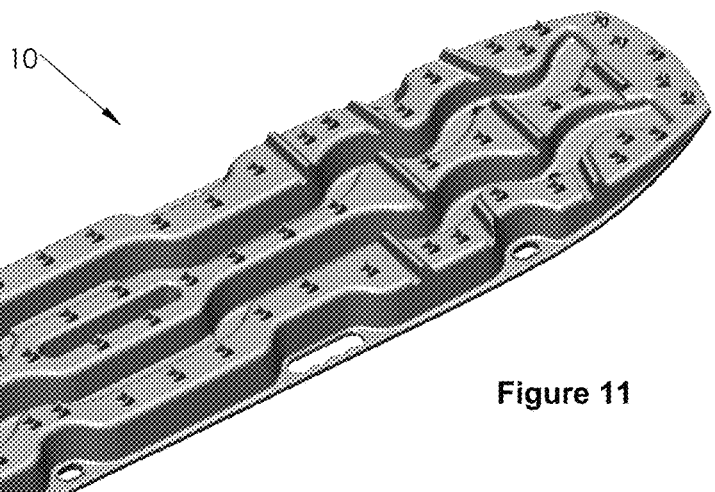
FIG. 11 is a diagrammatic view of the recovery board of the first preferred embodiment with the removable base attached to the rear end of the recovery board and FIG. 12 is a partial view of the pin attachment arrangement of the removable base.
Figure 12:
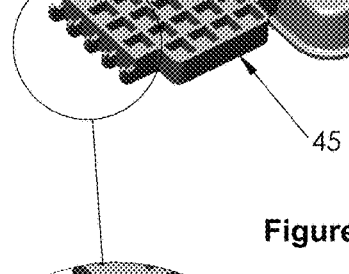
Figure 13:
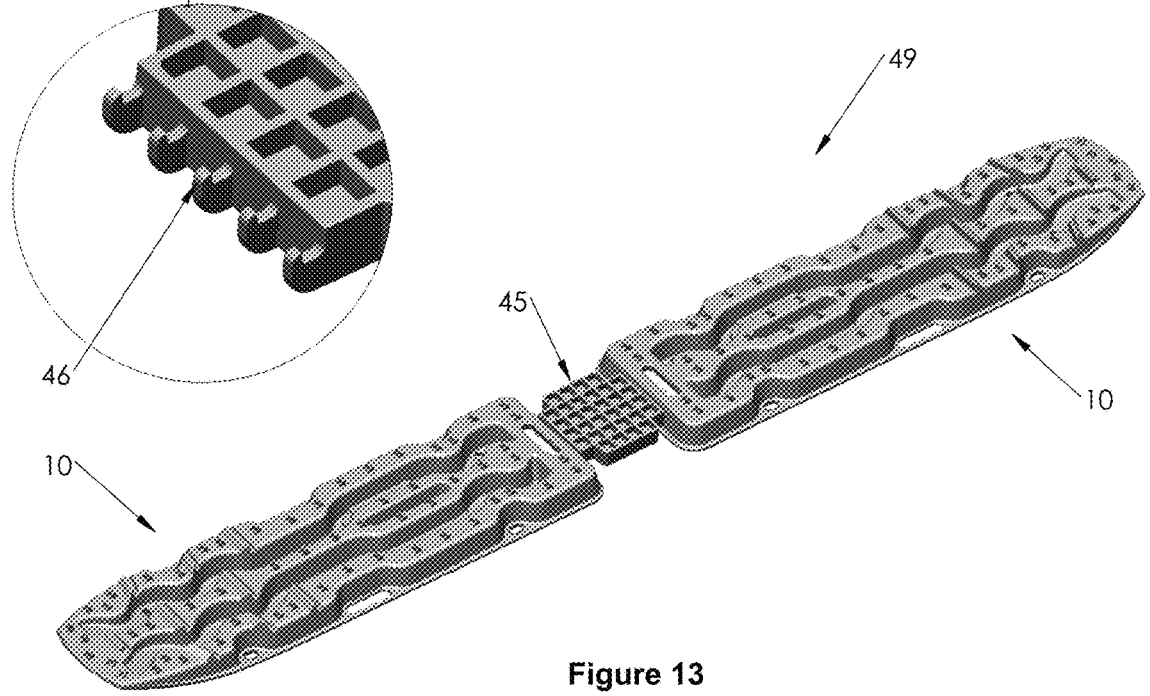
FIG. 13 is a diagrammatic view of an extended platform formed by two recovery boards connected together with the removable base.

The underside 12 is further shown in FIGS. 9 and 10. The underside 12 has a series of Y-shaped ground engagement teeth 44 projecting outwardly. The ground engagement teeth 44 serve to limit movement or slippage of the vehicle recovery board 10 during use. There is also a removable base 45 attached to the underside 12. The removable base 45 is substantially square with a series of five pins 46 extending outwardly from two opposite sides. The removable base 45 has an underside lattice structure. The removable base 45 in FIG. 9 is shown with its plan flat surface upward, facilitating the use of a high lift jack when the base is fitted to board allowing the board to distribute the jack load over a larger area. The recovery board 10 shown in FIG. 10 shows the underside 12 without the removable base 45.

The removable base has two possible functions. The first function is when the base 45 is fitted into the underside of the recovery board 10. In this position the upward flat surface allows for the multidirectional use as a support base for a jack or similar lifting device. The base in conjunction with the recovery board allows for an increased surface area for weight distribution and varying orientations. The recovery board in this orientation provides stability on soft surfaces. The second function is when the section is removed from the underside of the recovery board and used as a connector for two recovery boards. This function extends the vehicle recovery distance. The connection points are at the rear handle end of each recover board and use a pin and slot arrangement for connection. With the lattice-like structure (for tire grip and additional strength) facing upwards the base fits into the rear end of each recovery board.

With reference to FIGS. 11 to 15, there is shown the use of the removable base 45 to connect two vehicle recovery boards 10. The pins 46 of the removable base 45 are inserted into complementary slots 17 on the rear end 16 of the vehicle recovery board 10. In this way two vehicle recovery boards 10 are connected together, rear end to rear end, to form an extended platform 49. The removable base 45 has a lattice structure that keeps weight to a minimum, allows water, sand or other materials to pass therethrough without disrupting the connection and serve as a location indicator by way of sound and drive feel when the vehicle passes over.

Figure 17:
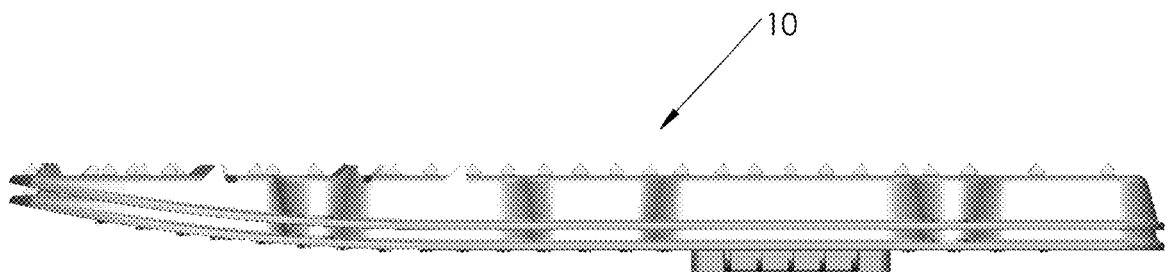
FIG. 17 is a side view of two recovery boards of the of the first preferred embodiment nesting or stacked together.

FIGS. 16 and 17 diagrammatically show the nesting of two vehicle recovery boards 10. The ability of the vehicle recovery boards 10 to nest or stack is useful for transporting and storage.

FIGS. 22 to 36 show a second preferred embodiment of the vehicle recovery board and FIGS. 37 to 50 show a third preferred embodiment of the vehicle recovery board. Both the second and third preferred embodiments of the vehicle recovery board are alternate versions of the vehicle recovery board. Neither the second preferred embodiment or the third preferred embodiment have a removable base or a short longitudinally disposed groove as shown in the first preferred embodiment of the vehicle recovery board. As well the studs of the second and third preferred embodiments of the vehicle recovery board are different in shape, but they could have the same shape as the first preferred embodiment of the recovery board while the studs of the first preferred embodiment could have the shape of the studs of the second and third preferred embodiments.

The second and third preferred embodiments of the vehicle recovery board are made of polypropylene and tend to be thicker than the vehicle recovery board of the first preferred embodiment to maintain the required strength. The second preferred embodiment of the recovery board is preferably 1110 mm×314 mm whereas the recovery board of the third embodiment is preferably 930 mm×290 mm.

With reference to FIGS. 22 to 36, there is shown a second preferred embodiment of the vehicle recovery board 51. The vehicle recovery board 51 has a topside surface 52 with longitudinal wave-like grooves 53, spaced apart ridges 54 and studs 55 extending upwardly from the ridges 54. The studs 55 have a five arm star shape. The topside surface 52 also has a series of three cleats 57 positioned near the front end 58 and spaced apart along the middle ridge 54. There are no transverse channels associated with the cleats 57. The second preferred embodiment of the vehicle recovery board 51 has two apertures 59 on each side of the vehicle recovery board 51. The second preferred embodiment of the vehicle recovery board 51 has a hand grip 60 on each side of the vehicle recovery board 51 and a hand grip 61 adjacent the rear end 63 of the vehicle recovery board 51.

Figure 33:
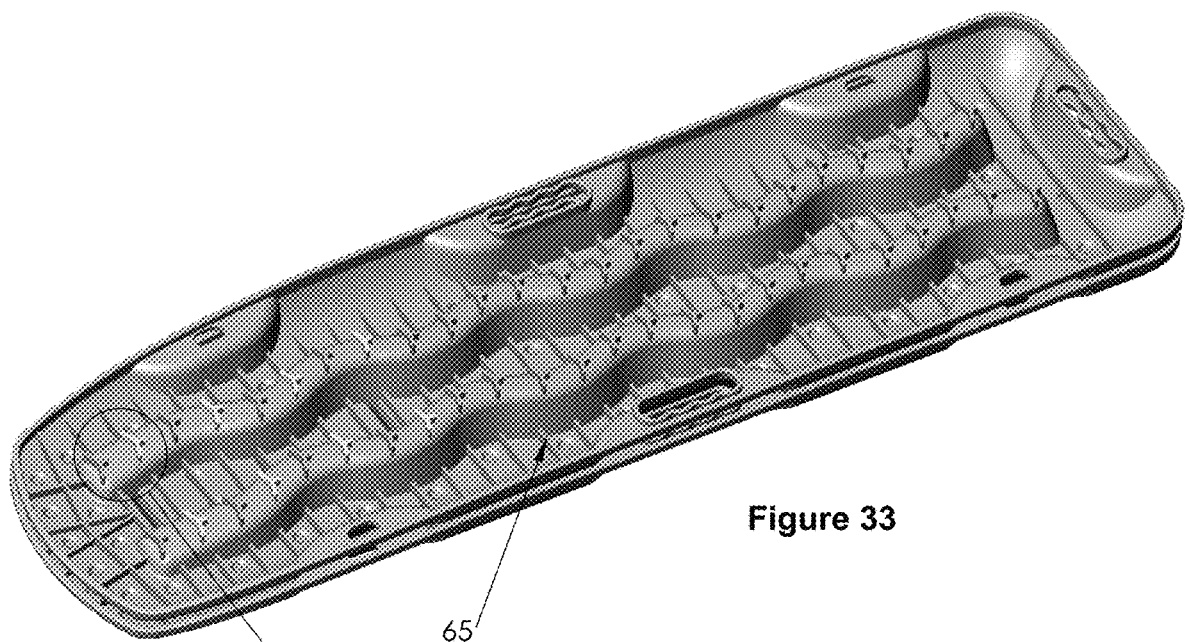
Figure 34:
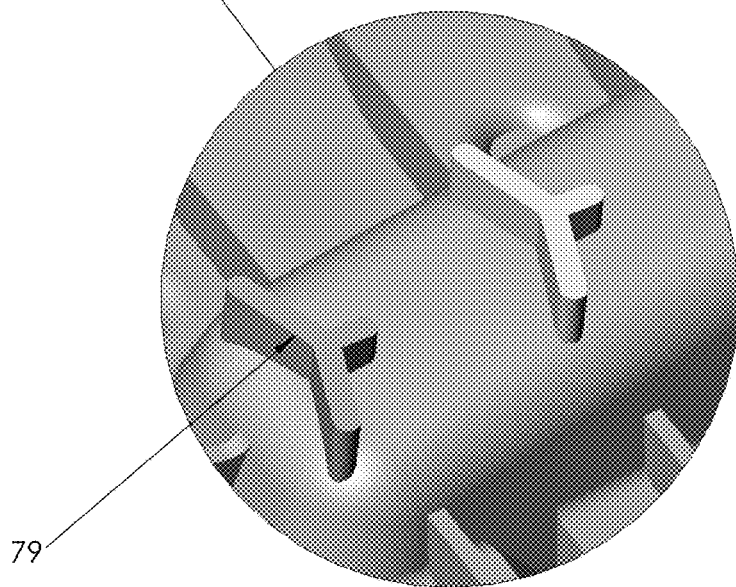
FIG. 34 is an expanded view of the Y-shaped ground engagement teeth.
Figure 35:
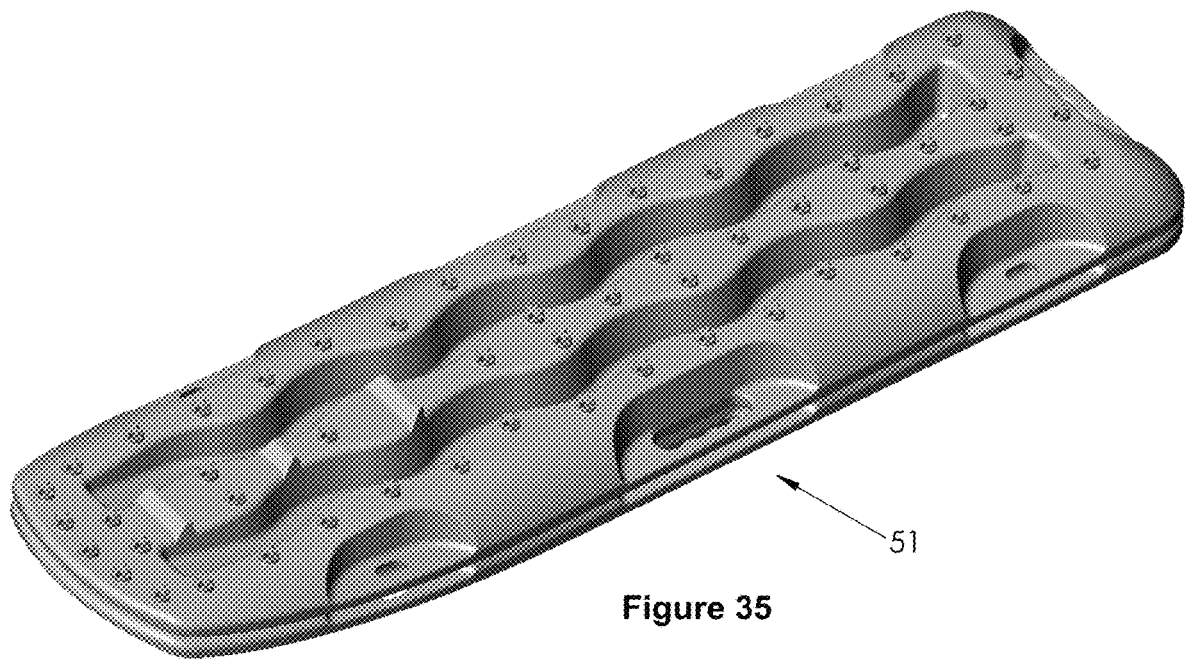
FIG. 35 and FIG. 36 are perspective and side diagrammatic views respectively of the second preferred embodiment of the recovery board in a nesting or stacked arrangement.
Figure 36:
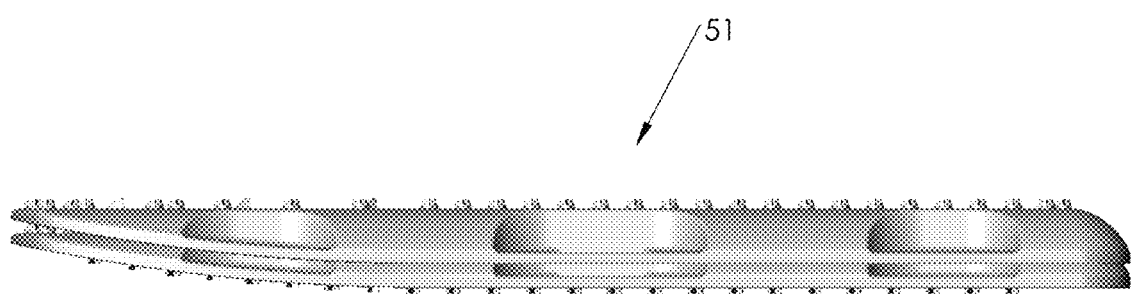
Figure 37:
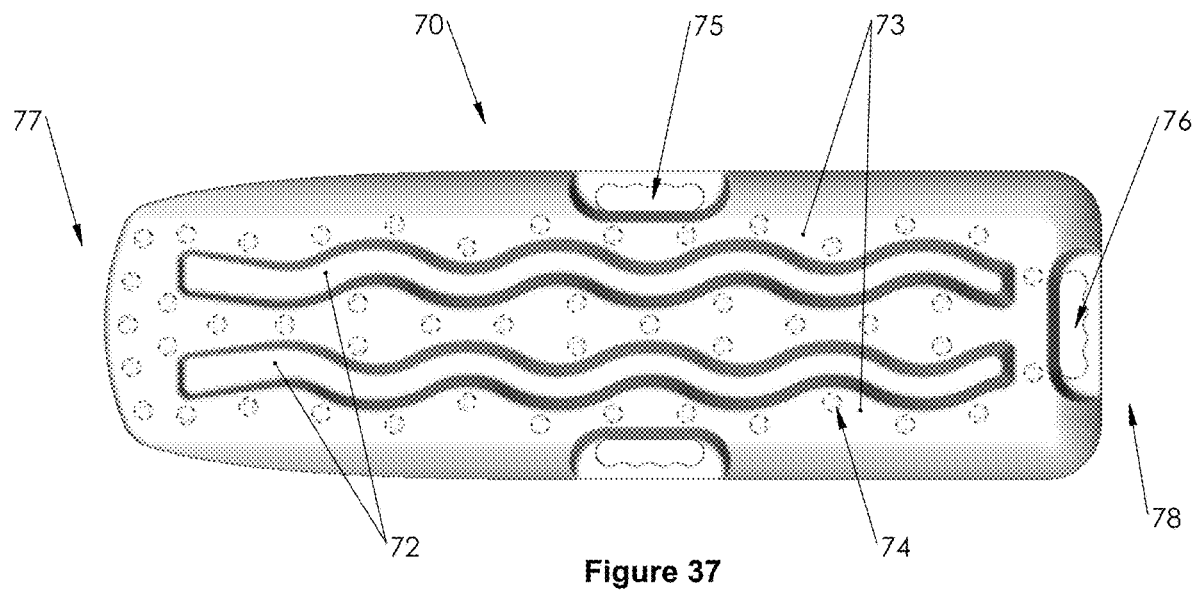
FIG. 37 is a diagrammatic plan view of a third preferred embodiment of the recovery board.
Figure 38:
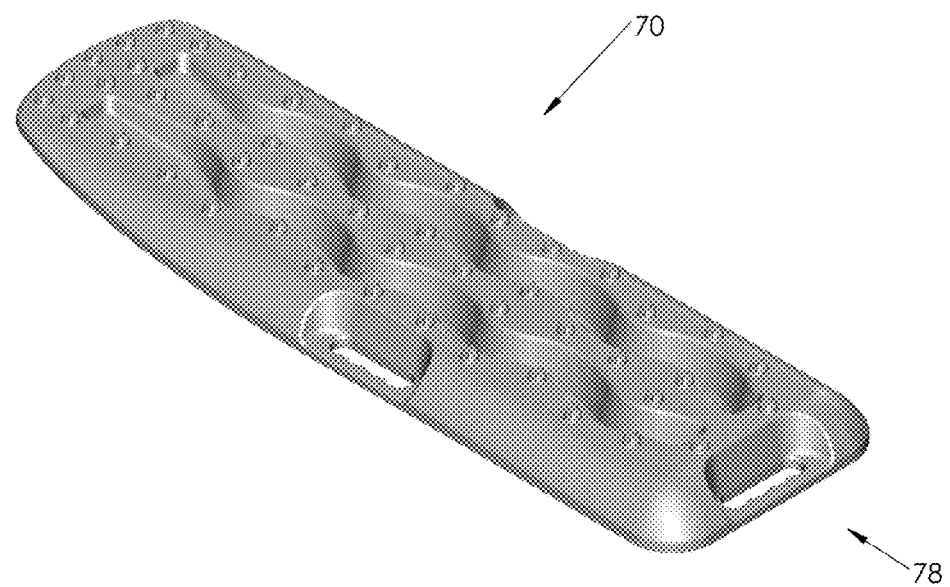
FIG. 38 is a top rear view of the third preferred embodiment of the recovery board.
Figure 39:
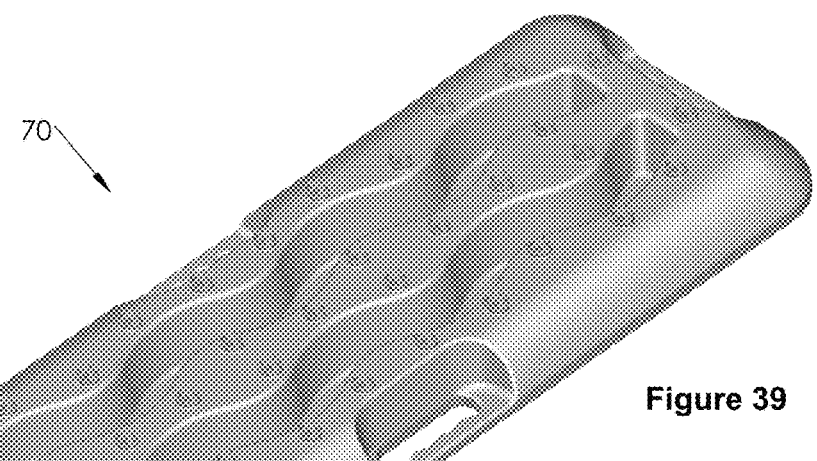
FIG. 39 is a top front view of the third preferred embodiment of the recovery board.
Figure 41:
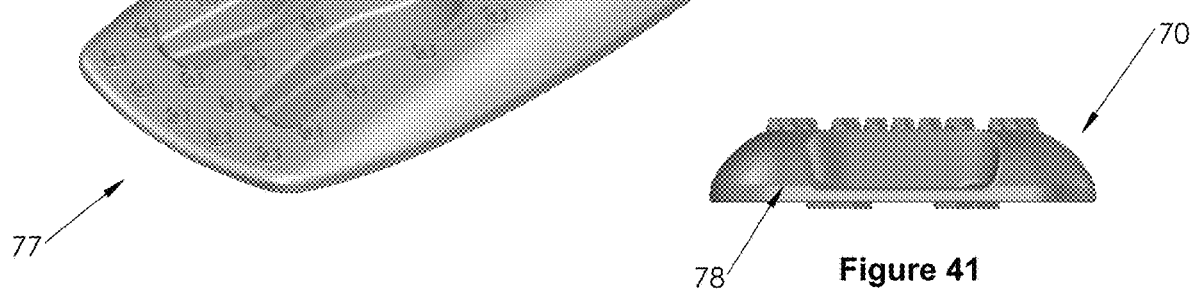
FIG. 41 is a rear view of the third preferred embodiment of the recovery board.
Figure 40:
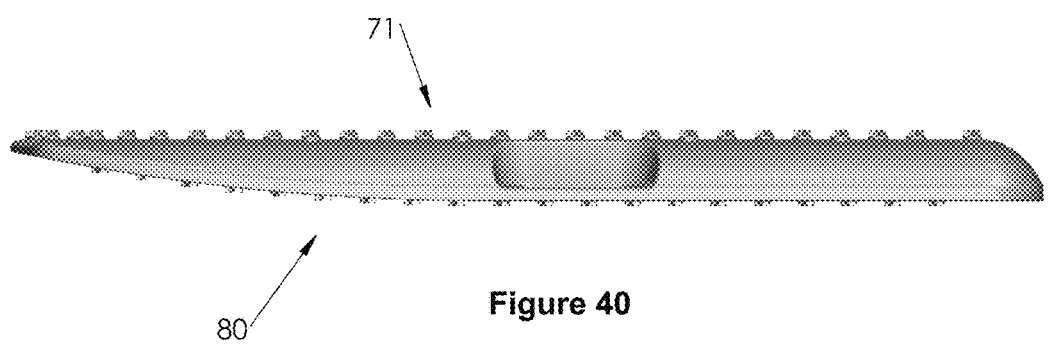
FIG. 40 is a side view of the third preferred embodiment of the recovery board.
Figure 42:
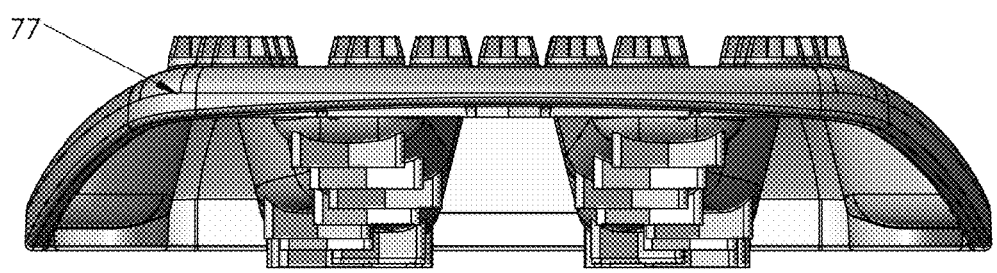
FIG. 42 is a front view of the preferred embodiment of the recovery board.
Figure 44:
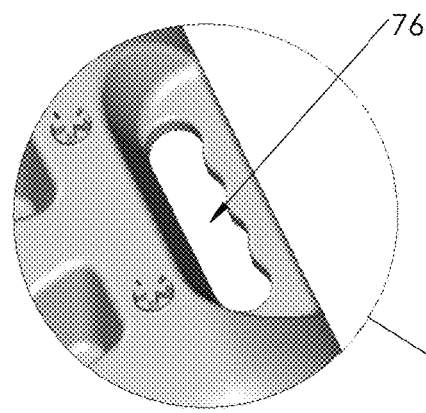
FIG. 44 is an expanded view of the rear handle.
Figure 43:
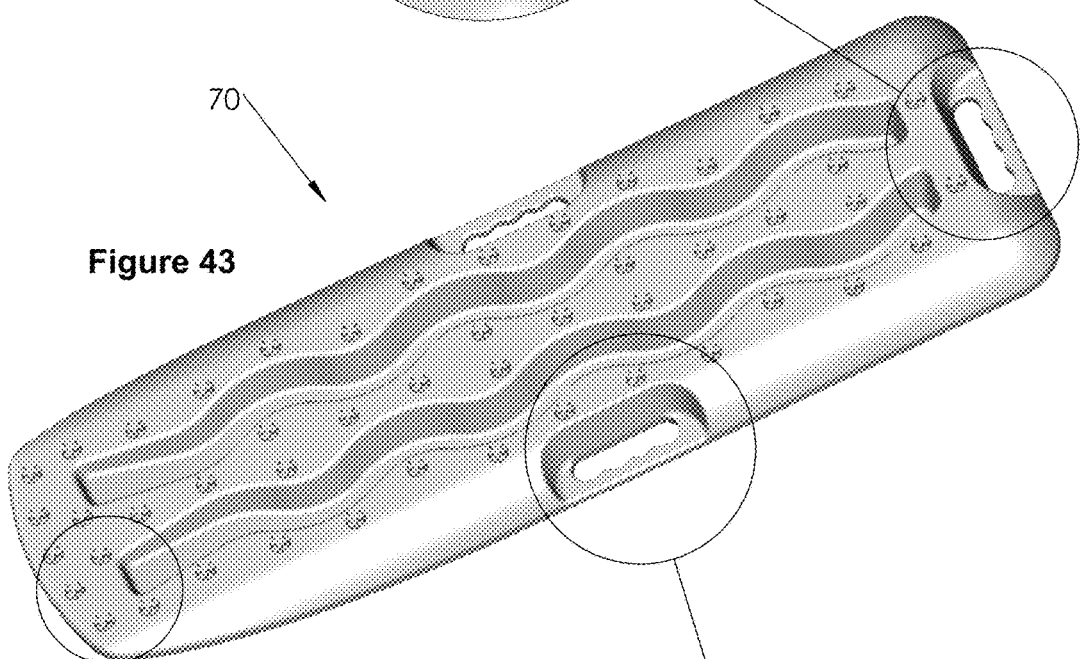
Figure 46:
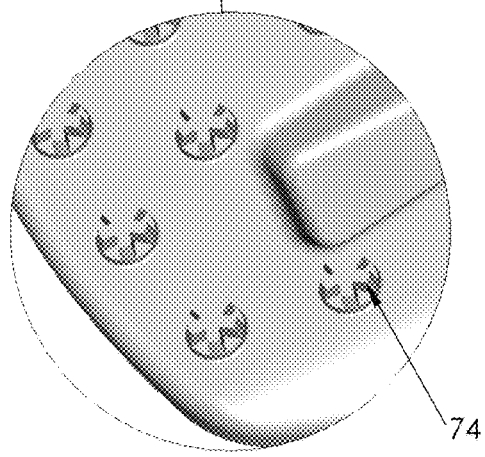
FIG. 46 is expanded view of the star shaped studs projecting from the topside surface of the recovery board.
Figure 45:
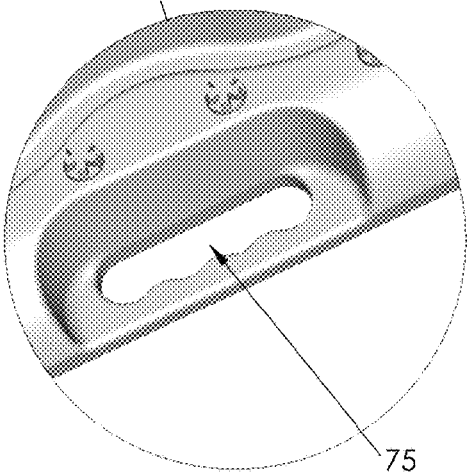
FIG. 45 is an expanded view of the side handle.

As with the recovery board of the first preferred embodiment, the topside surface 52 is relatively flat while the underside surface 65 has a flat section 66 and an inclined section 67. The underside 65 has a series of Y-shaped ground engagement teeth 79. FIGS. 33, 35 and 36 show the nesting or stacking of two vehicle recovery boards 51.

Figures 47, 48:
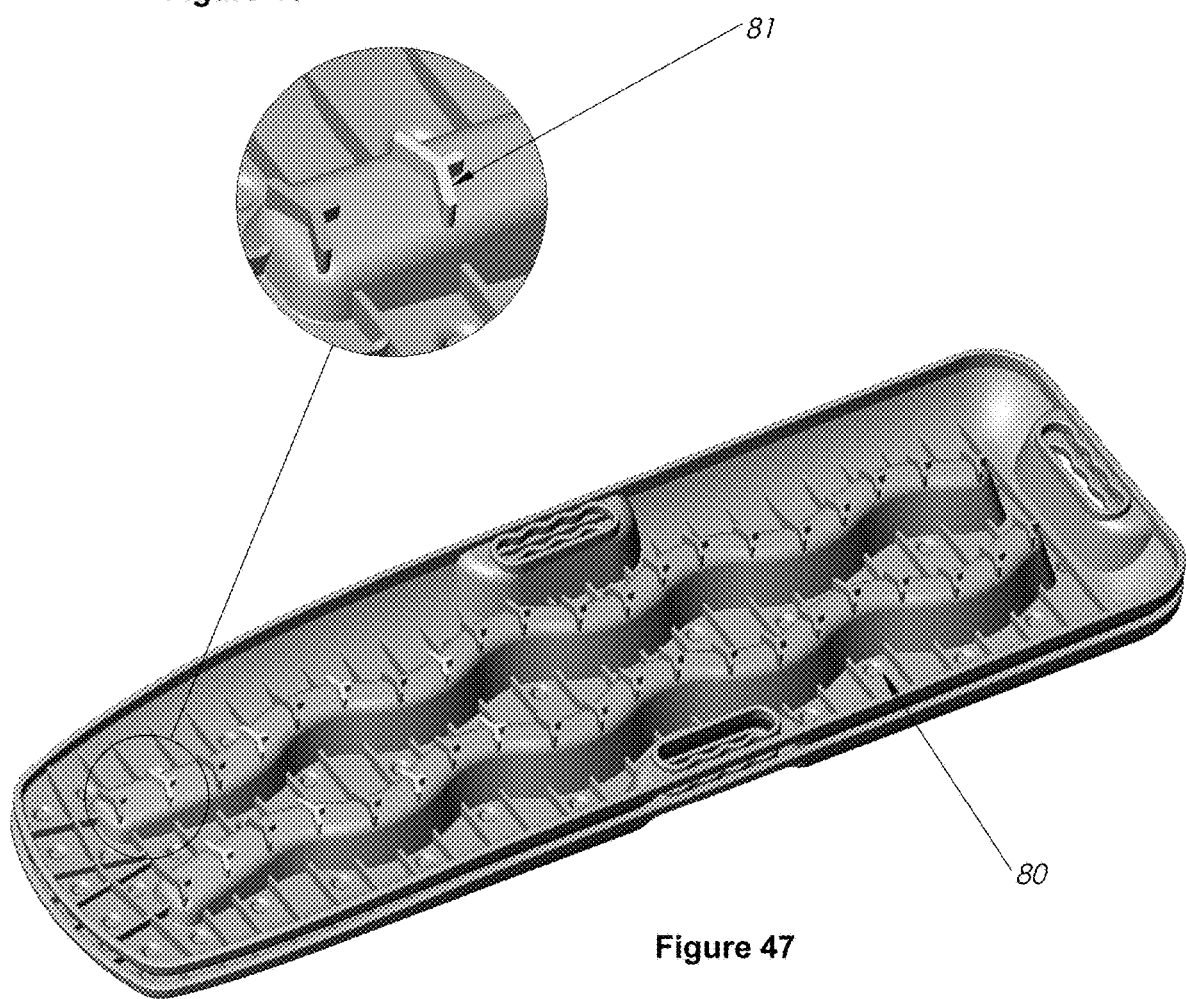
FIG. 47 is a diagrammatic view of the underside of the third preferred embodiment of the recovery board in a nesting or stacked arrangement and FIG. 48 is an expanded view of the Y-shaped ground engagement teeth.
Figure 49:
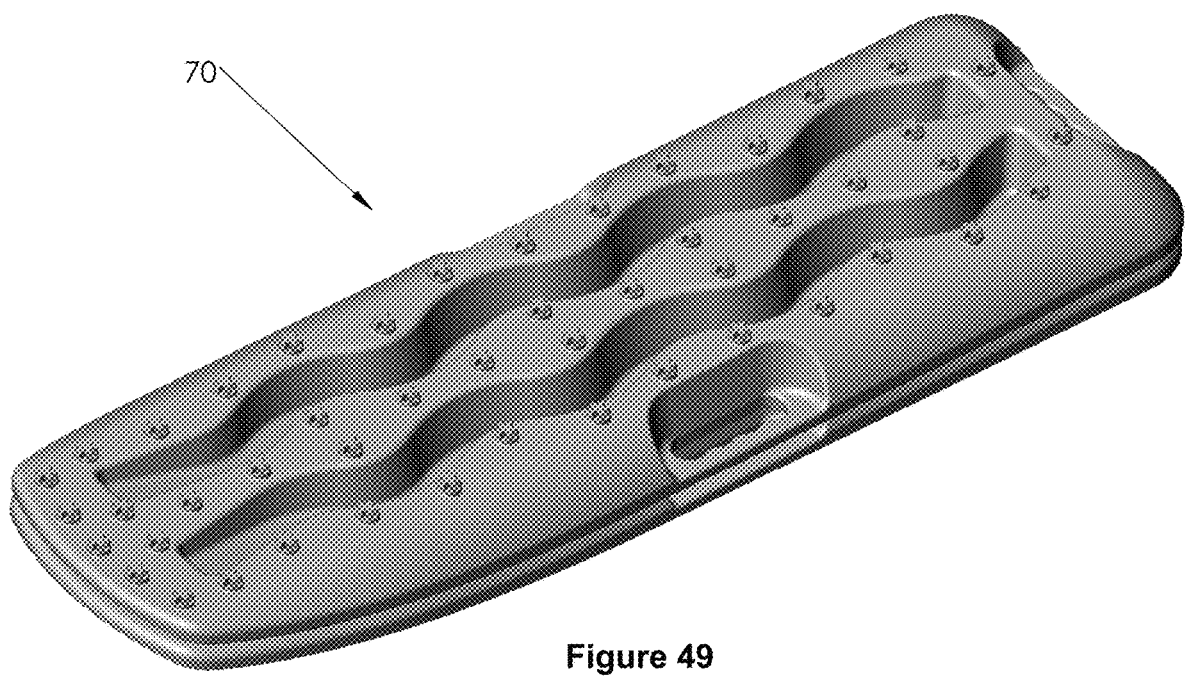
FIG. 49 and FIG. 50 are perspective and side diagrammatic views respectively of the third preferred embodiment of the recovery board in a nesting or stacked arrangement.
Figure 50:
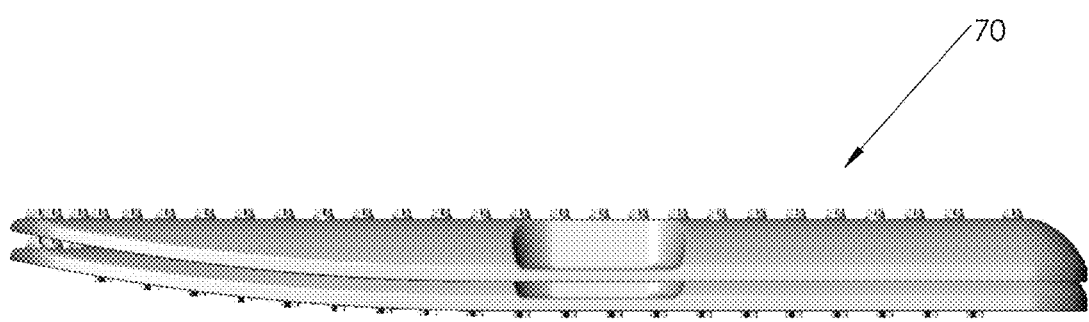

With reference to the third preferred embodiment of the vehicle recovery board, there is shown a vehicle recovery board 70 in FIGS. 37 to 50. The vehicle recovery board 70 is very similar to the vehicle recovery board 51 in having a topside surface 71 with two longitudinal wave-like grooves 72 and spaced apart ridges 73. The topside surface 71 does not have any cleats. The vehicle recovery board 70 has a series of five arm star shaped studs 74, side hand grips 75 and a rear hand grip 76. The vehicle recovery board 70 has a front end 77 and a rear end 78. The underside 80 has a series of Y-shaped ground engagement teeth 81. FIGS. 47, 49 and 50 show the nesting or stacking of two vehicle recovery boards 70.

In use, the vehicle recovery board of the preferred embodiments can be used to assist a vehicle to exit from a sand trap where the continual spinning of the wheels finds no traction and digs a deeper hole until the wheels are buried up to the axle. The present vehicle recovery board can be used as a shovel to remove the sand from around the tire. The vehicle recovery board is held by the rear and side hand grips to use the front portion as a shovel. The sand around the tire is removed so that the vehicle recovery board can be positioned adjacent the tread of the tire, so that when the wheel turns the tire engages with the vehicle recovery board.

With the vehicle recovery board in place, the driver slowly accelerates the vehicle to allow the tires to engage the studs and the cleats on the topside surface without causing the wheels to spin. The weight of the vehicle on the vehicle recovery board forces the ground engagement teeth on the underside of the vehicle recovery board to engage thereby reducing slippage of the board as the wheel moves along the vehicle recovery board.

In the situation where support is required over a longer distance, two vehicle recovery boards can be joined together using the removable base to form an extended platform. If it is necessary to lift the chassis of the vehicle, the removable base positioned within the board can be used as a support for a high lift jack. The board provides a greater surface area to spread the load rather than have it concentrated on the base only.

Advantages

The vehicle recovery board of one or more of the preferred embodiments provides the advantage of providing a flat top surface on which a vehicle wheel can gain traction without negotiating a steep gradient. The vehicle recovery board of the present invention provides an improved board and easier method move a vehicle from a sand trap.

The vehicle recovery board of the present invention has features that improve tire traction and dislodge water, sand and other material from the tread of tires. The vehicle recovery board of the present invention also has ground engagement teeth on the underside of the board to reduce slippage of the board during use.

The vehicle recovery board of the first preferred embodiment has a removable base which can be used to join two recovery boards together to form an extended platform which is useful where support is required over a longer distance. The removable base can also be used as a support for a jack or other lifting apparatus when used in conjunction with the recovery board.

The shape of the vehicle recovery board of the present invention also allows it to be used as a shovel to remove sand and other material from around the tire.

Variations

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A vehicle recovery board having a rectangular body with a flat topside surface and an underside surface with an inclined front portion, and a removable base configured for attachment to the underside surface and adapted to be used to join two recovery boards end to end;
   wherein the topside surface has one or more longitudinal grooves spaced apart by one or more ridges and each of the one or more ridges has a plurality of upwardly-extending studs positioned along a length of the board, wherein the inclined front portion of the underside surface is directed upwards towards the topside surface near the front end,
   wherein the inclined front portion has one or more downwardly extending projections that are engageable with a ground surface and assist in maintaining a position of the vehicle recovery board as a vehicle rolls along the vehicle recovery board, and
   wherein in use, the topside surface, the inclined front portion of the underside surface, the longitudinal grooves, the one or more ridges, the upwardly-extending studs and the downwardly extending projections cooperate together to provide traction to a tire rolling along the topside surface while at the same time facilitate positioning of the vehicle recovery board to allow the tire to roll thereon.

2. A vehicle recovery board as claimed in claim 1, wherein the inclined front portion of the underside surface is a straight flat surface, a stepped surface and or a curved surface.

3. A vehicle recovery board as claimed in claim 1, wherein the inclination of the front portion of the underside surface can extend partway along the length of the board or a full length of the board so that the board has an appearance of an inverted wedge.

4. A vehicle recovery board as claimed in claim 1, wherein the front underside portion is convex relative to the flat topside surface.

5. A vehicle recovery board as claimed in claim 1, wherein a degree of inclination or a shape of a curve of the front underside portion enables the board to be positioned next to or partially beneath a tire enabling the tire to move along the topside surface which is at a constant angle for a length of the board.

6. A vehicle recovery board as claimed in claim 1, wherein the one or more grooves have a wave-like shape.

7. A vehicle recovery board as claimed in claim 1, wherein there are two or more ridges and there are a plurality of studs along the outer ridges to provide grip to a tire over the entire topside surface.

8. A vehicle recovery board as claimed in claim 1, wherein the studs are shaped projections and are located in different orientations on the board.

9. A vehicle recovery board as claimed in claim 1, wherein the topside surface has one or more ridges and one or more cleats extending across at least one of the ridges, said cleats are raised lugs that provide additional grip for a tire.

10. A vehicle recovery board as claimed in claim 9, wherein there are one or more wave-like grooves and a plurality of wave-like ridges, each of the one or more cleats can be orientated differently with respect to a longitudinal axis of the recovery board.

11. A vehicle recovery board as claimed in claim 10, wherein the arrangement of the one or more of the wave-like grooves, the plurality of wave-like ridges, the plurality of studs and cleats provides the topside surface that enables the vehicle tire to gain traction.

12. A vehicle recovery board as claimed in claim 9, wherein there are a plurality of cleats along a front section of the recovery board; wherein a shape, placement position, orientation and number of the cleats provides an uneven surface for a tire to gain traction.

13. A vehicle recovery board as claimed in claim 9, wherein the cleats are spaced from each other to allow different parts of the tire to gain traction and cater for different tire sizes and tread patterns.

14. A vehicle recovery board as claimed in claim 9, wherein there are a plurality of cleats and the cleats on adjacent ridges are not aligned with each other so as not to weaken the board in any particular area and maximize an opportunity to provide traction for the tire.

15. A vehicle recovery board as claimed in claim 9, wherein adjacent each of the one or more cleats, there is a transverse channel across the respective ridge, said transverse channel is positioned after the respective cleat with reference to the front end of the recovery board.

16. A vehicle recovery board as claimed in claim 1, wherein the underside of the recovery board has a plurality of ground engagement teeth to reduce slippage of the board when a tire attempts to gain traction on the topside surface of the board.

17. A vehicle recovery board as claimed in claim 16, wherein each of the plurality of ground engagement teeth have a chevron shape or a Y-like shape.

18. A vehicle recovery board as claimed in claim 1, wherein the vehicle recovery board can be used as a shovel to remove sand and the like from around a tire.

19. A vehicle recovery board as claimed in claim 18, wherein there are hand grips at a rear end and or along one or both longitudinal sides of the board; said hand grips are shaped and positioned to facilitate the shoveling action.

20. A vehicle recovery board as claimed in claim 1, wherein the removable base has a square or cross shape so that the vehicle recovery board can fit within the underside of the board.

21. A vehicle recovery board as claimed in claim 20, wherein the removable base can attach to a rear end of each board via a pin and slot arrangement.

22. A vehicle recovery board as claimed in claim 20, wherein the removable base when positioned within the board can be used to support a jack or other similar lifting device.

23. A vehicle recovery board as claimed in claim 1, wherein the recovery boards are shaped so that they can be stacked during storage or transport.

24. A vehicle recovery board as claimed in claim 1, wherein the recovery board is made of glass reinforced nylon or polypropylene.

25. A vehicle recovery board as claimed in claim 1, wherein the recovery board is made of glass reinforced nylon and has the features of a flat topside surface, an inclined or curved front portion of the underside surface; a plurality of longitudinal grooves spaced apart by ridges each of which have a plurality of studs positioned along a length of the board; a plurality of cleats and adjacent transverse channels; a plurality of ground engagement teeth on the underside of the board; one or more hand grips at a rear end and along one or both longitudinal sides of the board and a removable base.

26. A vehicle recovery board as claimed in claim 1, wherein the recovery board is made of polypropylene and has the features of a flat topside surface, an inclined or curved front portion of the underside surface; a plurality of longitudinal grooves spaced apart by ridges each of which have a plurality of studs positioned along a length of the board; a plurality of ground engagement teeth on the underside of the board; and one or more hand grips at a rear end and along one or both longitudinal sides of the board.

* * * * *